United States Patent
Davis et al.

(10) Patent No.: US 12,182,385 B2
(45) Date of Patent: Dec. 31, 2024

(54) BUILDING AUTOMATION SYSTEM WITH RESOURCE CONSUMPTION TRACKING FEATURES

(71) Applicant: Tyco Fire & Security GmbH, Neuhausen am Rheinfall (CH)

(72) Inventors: Robbie G. Davis, Kew Gardens, NY (US); Kerry M. Bell, Mukwonago, WI (US); Rajesh Nayak, Karnataka (IN); Kierstyn R. Robbins, Milwaukee, WI (US); Ann M. Cook, Neshkoro, WI (US)

(73) Assignee: TYCO FIRE & SECURITY GMBH, Neuhausen am Rheinfall (CH)

( * ) Notice: Subject to any disclaimer, the term of this patent is extended or adjusted under 35 U.S.C. 154(b) by 0 days.

(21) Appl. No.: 17/982,066

(22) Filed: Nov. 7, 2022

(65) Prior Publication Data

US 2023/0148149 A1    May 11, 2023

Related U.S. Application Data

(60) Provisional application No. 63/276,982, filed on Nov. 8, 2021.

(51) Int. Cl.
*G06F 3/04842* (2022.01)
*G06Q 50/163* (2024.01)

(52) U.S. Cl.
CPC ....... *G06F 3/04842* (2013.01); *G06Q 50/163* (2013.01)

(58) Field of Classification Search
CPC .......................... G06F 3/04842; G06Q 50/163
See application file for complete search history.

(56) References Cited

U.S. PATENT DOCUMENTS 8,375,068 B1 *  2/2013  Platt ................. G06Q 10/10
                                              705/7.29
8,421,588 B1 *  4/2013  Ross .................. G08C 17/02
                                              340/5.1

(Continued)

FOREIGN PATENT DOCUMENTS

| CA | 2957726 A1 | 3/2016 |
| CA | 3043996 A1 | 2/2018 |
| EP | 3 186 687 A4 | 7/2017 |
| EP | 3 497 377 A1 | 6/2019 |

OTHER PUBLICATIONS

Coolinglogic, "CoolingLogic: Up early, saving billions." URL: http://coolinglogic.com/documents/MarketingFlyer_FINAL_HiRes8.5x11.pdf, retrieved from internet Oct. 27, 2022 (1 page).

(Continued)

*Primary Examiner* — Jeremy L Stanley
(74) *Attorney, Agent, or Firm* — Foley & Lardner LLP

(57) ABSTRACT

A method executable by a building management system includes generating a graphical user interface that includes a bar graph comprising a plurality of bars representing resource consumption values for a plurality of time periods and a line overlaid on the bar graph and representing a baseline or target resource consumption. The method also includes comparing the resource consumption values to the baseline or target resource consumption, adding a first icon aligned with a first bar of the plurality of bars in response to determining that a first resource consumption value represented by the first bar is within a threshold of the baseline or target resource consumption and less than the baseline or target resource consumption, and adding a second icon aligned with the first bar in response to determining that the first resource consumption value exceeds the baseline. The second icon is different than the first icon.

18 Claims, 17 Drawing Sheets

(56) References Cited

U.S. PATENT DOCUMENTS

| | | | |
|---|---|---|---|
| 8,788,097 B2 | 7/2014 | Drees et al. | |
| 8,880,231 B2 | 11/2014 | Boucher et al. | |
| 9,069,338 B2 | 6/2015 | Drees et al. | |
| 9,152,610 B2 | 10/2015 | Drees et al. | |
| 9,256,702 B2 | 2/2016 | Elbsat et al. | |
| 9,286,582 B2 | 3/2016 | Drees et al. | |
| 9,298,203 B2 | 3/2016 | Wenzel | |
| 9,447,985 B2 | 9/2016 | Johnson | |
| 9,471,722 B2 | 10/2016 | Drees et al. | |
| 9,606,520 B2 | 3/2017 | Noboa et al. | |
| 9,639,413 B2 | 5/2017 | Drees et al. | |
| 9,753,455 B2 | 9/2017 | Drees | |
| 9,778,639 B2 | 10/2017 | Boettcher et al. | |
| 10,055,114 B2 | 8/2018 | Shah et al. | |
| 10,175,747 B2 * | 1/2019 | Kazuno | G06F 1/3206 |
| 10,186,889 B2 | 1/2019 | Wenzel et al. | |
| 10,197,632 B2 | 2/2019 | Wenzel et al. | |
| 10,222,427 S | 3/2019 | Wenzel et al. | |
| 10,250,039 B2 | 4/2019 | Wenzel et al. | |
| 10,261,485 B2 | 4/2019 | Drees et al. | |
| 10,317,863 B2 | 6/2019 | Papadopoulos | |
| 10,318,895 B1 * | 6/2019 | Norwood | G06Q 10/0631 |
| 10,325,331 B2 * | 6/2019 | Drees | G01R 21/00 |
| 10,402,767 B2 | 9/2019 | Noboa et al. | |
| 10,418,832 B2 | 9/2019 | Wenzel et al. | |
| 10,418,833 B2 | 9/2019 | Wenzel et al. | |
| 10,527,306 B2 * | 1/2020 | Boettcher | H02J 3/14 |
| 10,558,227 B2 | 2/2020 | Alcala Perez et al. | |
| 10,661,109 B2 | 5/2020 | Trivelpiece et al. | |
| 10,706,375 B2 | 7/2020 | Wenzel et al. | |
| 10,718,632 B1 * | 7/2020 | Platt | H04L 67/125 |
| 10,739,741 B2 | 8/2020 | Wenzel et al. | |
| 10,739,742 B2 | 8/2020 | Kumar et al. | |
| 10,871,756 B2 | 12/2020 | Johnson et al. | |
| 10,901,446 B2 | 1/2021 | Nesler et al. | |
| 10,908,578 B2 | 2/2021 | Johnson et al. | |
| 10,921,768 B2 | 2/2021 | Johnson et al. | |
| 10,928,784 B2 | 2/2021 | Craig et al. | |
| 10,955,800 B2 | 3/2021 | Burroughs et al. | |
| 11,042,924 B2 | 6/2021 | Asmus et al. | |
| 11,061,424 B2 | 7/2021 | Elbsat et al. | |
| 11,156,978 B2 | 10/2021 | Johnson et al. | |
| 11,157,021 B2 | 10/2021 | Mucci | |
| 11,268,732 B2 | 3/2022 | Boettcher et al. | |
| 11,268,996 B2 | 3/2022 | Vitullo et al. | |
| 11,269,303 B2 | 3/2022 | Wenzel et al. | |
| 11,281,173 B2 | 3/2022 | Turney et al. | |
| 11,283,669 B1 | 3/2022 | Przybylski et al. | |
| 11,385,605 B2 | 7/2022 | Wenzel et al. | |
| D960,174 S | 8/2022 | Gao et al. | |
| 11,416,796 B2 | 8/2022 | Przybylski et al. | |
| 11,445,024 B2 | 9/2022 | Turney et al. | |
| 2009/0231152 A1 * | 9/2009 | Tung | G06F 1/206 |
| | | | 340/660 |
| 2011/0211851 A1 * | 9/2011 | Imine | G06F 1/3209 |
| | | | 399/37 |
| 2011/0289019 A1 * | 11/2011 | Radloff | G01D 4/002 |
| | | | 705/412 |
| 2012/0150707 A1 | 6/2012 | Campbell et al. | |
| 2013/0144452 A1 * | 6/2013 | Takakura | G05B 11/01 |
| | | | 700/291 |
| 2014/0006314 A1 * | 1/2014 | Yu | G06Q 30/0283 |
| | | | 705/412 |
| 2014/0062707 A1 * | 3/2014 | Hong | H04Q 9/00 |
| | | | 340/657 |
| 2014/0278165 A1 | 9/2014 | Wenzel et al. | |
| 2014/0279711 A1 * | 9/2014 | Angelis | G06Q 10/06 |
| | | | 705/412 |
| 2015/0008900 A1 * | 1/2015 | Takehara | G06Q 10/06 |
| | | | 324/113 |
| 2015/0088442 A1 * | 3/2015 | Farrar | G01R 22/063 |
| | | | 702/62 |
| 2015/0213704 A1 * | 7/2015 | Umamoto | H02J 3/14 |
| | | | 340/636.1 |
| 2015/0326017 A1 * | 11/2015 | Sasaki | H02J 3/32 |
| | | | 307/24 |
| 2016/0004297 A1 * | 1/2016 | Kazuno | H02J 7/34 |
| | | | 713/320 |
| 2016/0004805 A1 | 1/2016 | Drees et al. | |
| 2016/0103432 A1 * | 4/2016 | Lyu | G05B 15/02 |
| | | | 700/275 |
| 2016/0103475 A1 * | 4/2016 | Lee | G06F 1/3206 |
| | | | 700/291 |
| 2016/0116374 A1 * | 4/2016 | Strelec | F23N 1/002 |
| | | | 702/182 |
| 2016/0172906 A1 * | 6/2016 | Maruyama | G05B 15/02 |
| | | | 700/297 |
| 2016/0189522 A1 * | 6/2016 | Wang | H04M 1/72403 |
| | | | 340/540 |
| 2016/0246268 A1 | 8/2016 | Elbsat et al. | |
| 2016/0334763 A1 * | 11/2016 | Nakayama | G05B 13/021 |
| 2017/0102675 A1 | 4/2017 | Drees | |
| 2017/0104336 A1 | 4/2017 | Elbsat et al. | |
| 2017/0104337 A1 | 4/2017 | Drees | |
| 2017/0104342 A1 | 4/2017 | Elbsat et al. | |
| 2017/0104343 A1 | 4/2017 | Elbsat et al. | |
| 2017/0104449 A1 | 4/2017 | Drees | |
| 2017/0212482 A1 * | 7/2017 | Boettcher | H02J 13/00002 |
| 2017/0212668 A1 * | 7/2017 | Shah | G06F 3/0486 |
| 2017/0284691 A1 | 10/2017 | Sinha et al. | |
| 2017/0357240 A1 * | 12/2017 | Stewart | G06Q 10/06393 |
| 2017/0359233 A1 * | 12/2017 | Chen | H04M 15/851 |
| 2018/0195748 A1 | 7/2018 | Sinha et al. | |
| 2018/0248403 A1 * | 8/2018 | Takashita | H02J 13/00 |
| 2018/0254634 A1 * | 9/2018 | Han | G06Q 10/04 |
| 2018/0316517 A1 | 11/2018 | Henzig et al. | |
| 2019/0033802 A1 * | 1/2019 | Chatterjee | H04L 41/06 |
| 2019/0086878 A1 * | 3/2019 | Ranjan | G01D 4/004 |
| 2019/0089193 A1 * | 3/2019 | Ranjan | G09G 5/14 |
| 2019/0154873 A1 * | 5/2019 | Mitterhofer | G01W 1/00 |
| 2019/0187632 A1 | 6/2019 | Wenzel et al. | |
| 2019/0302157 A1 * | 10/2019 | Vitullo | G01K 17/20 |
| 2019/0302709 A1 * | 10/2019 | Vitullo | G05B 13/041 |
| 2019/0312429 A1 | 10/2019 | Vitullo et al. | |
| 2020/0044876 A1 | 2/2020 | Piccolo et al. | |
| 2020/0057827 A1 * | 2/2020 | Eckenrode | G06Q 10/06315 |
| 2020/0065444 A1 * | 2/2020 | Bullock | G06F 30/367 |
| 2020/0090289 A1 | 3/2020 | Elbsat et al. | |
| 2020/0126164 A1 | 4/2020 | Pancholi et al. | |
| 2020/0132328 A1 * | 4/2020 | Boettcher | G05B 15/02 |
| 2020/0188718 A1 | 6/2020 | Trivelpiece et al. | |
| 2020/0200420 A1 * | 6/2020 | Nayak | F24F 11/523 |
| 2020/0225654 A1 * | 7/2020 | Vitullo | G05B 23/0294 |
| 2020/0226524 A1 | 7/2020 | Bhattacharya et al. | |
| 2020/0226525 A1 | 7/2020 | Bhattacharya et al. | |
| 2020/0234220 A1 | 7/2020 | Ma et al. | |
| 2020/0241491 A1 * | 7/2020 | Przybylski | G05B 15/02 |
| 2020/0242493 A1 * | 7/2020 | Botea | G06N 5/048 |
| 2020/0284457 A1 | 9/2020 | Sinha et al. | |
| 2020/0326666 A1 | 10/2020 | Salsbury et al. | |
| 2021/0014122 A1 | 1/2021 | Patil et al. | |
| 2021/0081811 A1 | 3/2021 | Brown et al. | |
| 2021/0123771 A1 * | 4/2021 | Vega | G01D 4/004 |
| 2021/0125129 A1 * | 4/2021 | Vega | G06Q 10/06315 |
| 2021/0135454 A1 * | 5/2021 | Harbaugh | H02J 3/144 |
| 2021/0172634 A1 | 6/2021 | Drees et al. | |
| 2021/0181703 A1 | 6/2021 | Perez et al. | |
| 2021/0191378 A1 | 6/2021 | Amores et al. | |
| 2021/0216928 A1 | 7/2021 | O'Toole et al. | |
| 2021/0216938 A1 | 7/2021 | Chakraborty et al. | |
| 2021/0381861 A1 | 12/2021 | Brown et al. | |
| 2022/0026864 A1 | 1/2022 | Murugesan et al. | |
| 2022/0058556 A1 | 2/2022 | Warake et al. | |
| 2022/0067851 A1 | 3/2022 | Sinha et al. | |
| 2022/0094162 A1 * | 3/2022 | Lee | H02J 3/144 |
| 2022/0107632 A1 * | 4/2022 | Sinha | G05B 23/0283 |
| 2022/0284519 A1 | 9/2022 | Pancholi et al. | |

OTHER PUBLICATIONS

Incomplete File of Communication with Various Companies, etc. in 2016-2021, URL: http://coolinglogic.com/documents/22072101_

(56) References Cited

OTHER PUBLICATIONS

Letters_and_Signature_Receipts.pdf, published, as one document, on: Jul. 21, 2022 (211 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency and Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church a Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

* cited by examiner

BUILDING AUTOMATION SYSTEM WITH RESOURCE CONSUMPTION TRACKING FEATURES

CROSS-REFERENCE TO RELATED APPLICATION

This application claims priority to and the benefit of U.S. Provisional Application No. 63/276,982, filed Nov. 8, 2021, the entire disclosure of which is incorporated by reference herein.

BACKGROUND

The present disclosure relates generally to building management systems. The present disclosure relates more particularly to systems and methods for tracking usage of commodities associated with a facility.

To achieve sustainability goals, it is important to keep a check on consumption of resources such as energy and water. Energy consumption associated with buildings, including with heating and cooling buildings, accounts for a large percentage of worldwide energy consumption. Additionally, because of links between energy consumption and production and carbon dioxide emissions (and emission of other pollutants), energy consumption and generation relating to building operations currently adds a significant amount of carbon dioxide to the atmosphere, which contributes to climate change.

Due to the environmental and ecological effects of carbon dioxide emissions, a technical challenge exists to reduce or eliminate carbon emissions associated with building operations or to achieve carbon neutrality for building operations. For example, a building owner may have a desire (due to consumer demands, regulatory requirements, personal convictions, etc.) to reduce carbon emissions or achieve carbon neutrality for a building or campus. Due to connectivity to and reliance on utility grids, which most building owners have no control over, building owners typically do not have the technological capabilities to significantly reduce their carbon footprint using existing technologies.

Similarly, it is of paramount importance to save and responsibly consume water as it is one of the most critical and primary sustainability metrics because of its prevalent, daily usage within buildings and facilities. Wastage of water due to leaking pipes or distribution lines is also one of the major contributors of excess water consumption.

Accordingly, systems and methods to improve resource/commodity consumption that is associated with sustainability goals of buildings is desirable. Wide-scale deployment of such solutions can have positive effects on the environment while also reducing operational costs for building owners.

SUMMARY

A method executable by a building management system includes generating a graphical user interface showing a bar graph comprising a plurality of bars representing resource consumption values for a plurality of time periods and a line overlaid on the bar graph and representing a baseline or target resource consumption. The method also includes comparing the resource consumption values to the baseline or target resource consumption, adding a first icon aligned with a first bar of the plurality of bars in response to determining that a first resource consumption value represented by the first bar is within a threshold of the baseline or target resource consumption and less than the baseline or target resource consumption, and adding a second icon aligned with the first bar in response to determining that the first resource consumption value exceeds the baseline, the second icon different than the first icon.

In some embodiments, the method includes generating the graphical user interface further comprises showing an additional line overlaid on the bar graph representing an additional baseline or target resource consumption. In some embodiments, the method includes obtaining one or more values defining the baseline or target resource consumption from a user. In some embodiments, the method includes determining the baseline or target resource consumption based on historical resource consumption values.

In some embodiments, the method includes the threshold as a percentage of the baseline or target resource consumption. In some embodiments, the method includes providing a selectable option for the user to adjust the percentage.

In some embodiments, the method includes comprising generating the resource consumption values by aggregating data from a plurality of meters.

In some embodiments, the method includes providing the graphical user interface with a user-selectable option to adjust an operation of building equipment based on presence or absence of the first icon or the second icon and adjusting the operation of the building equipment in response to selection of the user-selectable option such that resource consumption by the building equipment is affected.

Another implementation of the present disclosure is one or more non-transitory computer-readable media storing program instructions that, when executed by one or more processors, cause the one or more processors to perform operations. The operations include generating a graphical user interface showing a bar graph comprising a plurality of bars representing resource consumption values for a plurality of time periods and a line overlaid on the bar graph and representing a baseline or target resource consumption. The operations also include comparing the resource consumption values to the baseline or target resource consumption, adding a first icon aligned with a first bar of the plurality of bars in response to determining that a first resource consumption value represented by the first bar is within a threshold of the baseline or target resource consumption and less than the baseline or target resource consumption, and adding a second icon aligned with the first bar in response to determining that the first resource consumption value exceeds the baseline, the second icon different than the first icon.

In some embodiments, the operations also include showing an additional line overlaid on the bar graph representing an additional baseline or target resource consumption. In some embodiments, the operations also include obtaining one or more values defining the baseline or target resource consumption from a user. In some embodiments, the operations also include determining the baseline or target resource consumption based on historical resource consumption values.

In some embodiments, the operations also include determining the threshold as a percentage of the baseline or target resource consumption. In some embodiments, the operations also include providing a selectable option for the user to adjust the percentage. In some embodiments, the operations also include generating the resource consumption values by aggregating data from a plurality of meters.

In some embodiments, the operations also include providing the graphical user interface with a user-selectable option to adjust an operation of building equipment based on presence or absence of the first icon or the second icon and adjusting the operation of the building equipment in response to selection of the user-selectable option.

Another implementation of the present disclosure is a system. The system includes building equipment operable to consume a resource and a processing circuit programmed to generate a graphical user interface showing a bar graph comprising a plurality of bars representing amounts of consumption of the resource by the building equipment for a plurality of time periods and a line overlaid on the bar graph and representing a baseline or target resource consumption. The processing circuit is also programmed to compare the amounts of consumption to the baseline or target resource consumption, add a first icon aligned with a first bar of the plurality of bars in response to determining that a first amount of the amounts of consumption represented by the first bar is within a threshold of the baseline or target resource consumption and less than the baseline or target resource consumption, and add a second icon aligned with the first bar in response to determining that the first amount exceeds the baseline, the second icon different than the first icon.

In some embodiments, the processing circuit is further programmed to determine the threshold as a percentage of the baseline or target resource consumption. In some embodiments, the processing circuit is further programmed to provide, via the graphical user interface, a selectable option for the user to adjust the percentage.

In some embodiments, the processing circuit is further programmed to provide the graphical user interface with a user-selectable option to adjust an operation of the building equipment based on presence or absence of the first icon or the second icon and adjust the operation of the building equipment in response to selection of the user-selectable option.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 14:
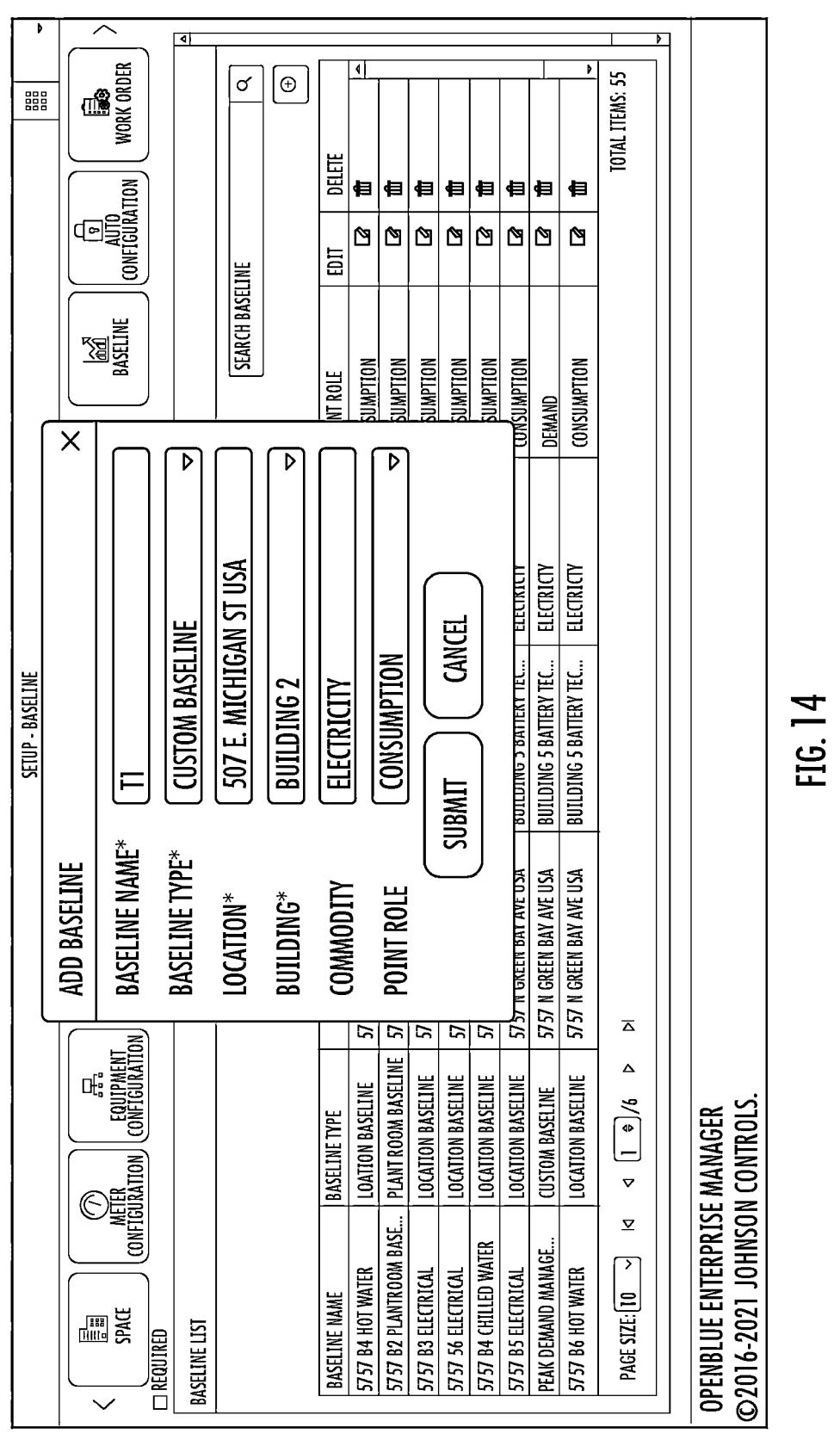
Figure 15:
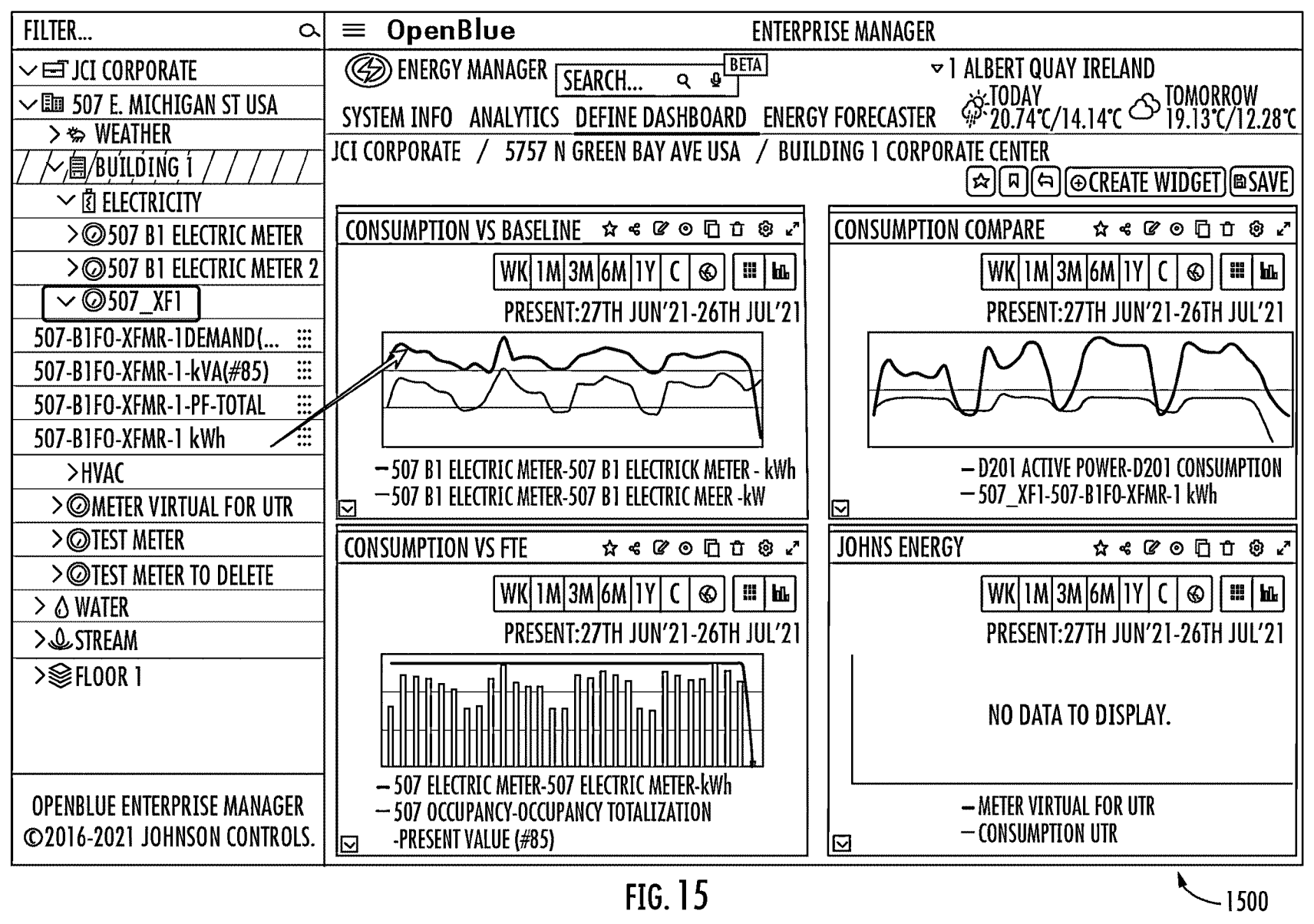

FIGS. 14, 15, 16, and 17 are snapshots of a custom dashboard, according to some embodiments.

DETAILED DESCRIPTION

Overview

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

Teachings herein enable building managers (e.g., users of a BMS) to manage resource consumption, for example electricity consumption, water consumption, natural gas consumption, etc. Resource consumption contributes to environmental degradation, climate change, aggravated drought conditions and water shortages, etc. The present application in part addresses technical challenges in surfacing resource consumption data to users in a manner that provides meaningful insights and enables operational changes to reduce consumption to at or below baseline values or consumption targets. Because of the complexity of a typical BMS system, such data is often difficult to find, presented in only diverse places or interfaces (e.g., separate interfaces for different equipment, different types of equipment, different resources, etc.) and thus not practically available to or collectable by human users. The present disclosure thus provides technical advantages in providing meaningful insights into resource consumption and enabling actions to reduce consumption to acceptable values, for example at or below baselines or targets.

Building and Building Management System

Referring generally to the FIGURES, a building automation system with resource consumption tracking feature to aid in achieving sustainability goals for a building or premises is demonstrated, according to various exemplary embodiments.

Figure 1:
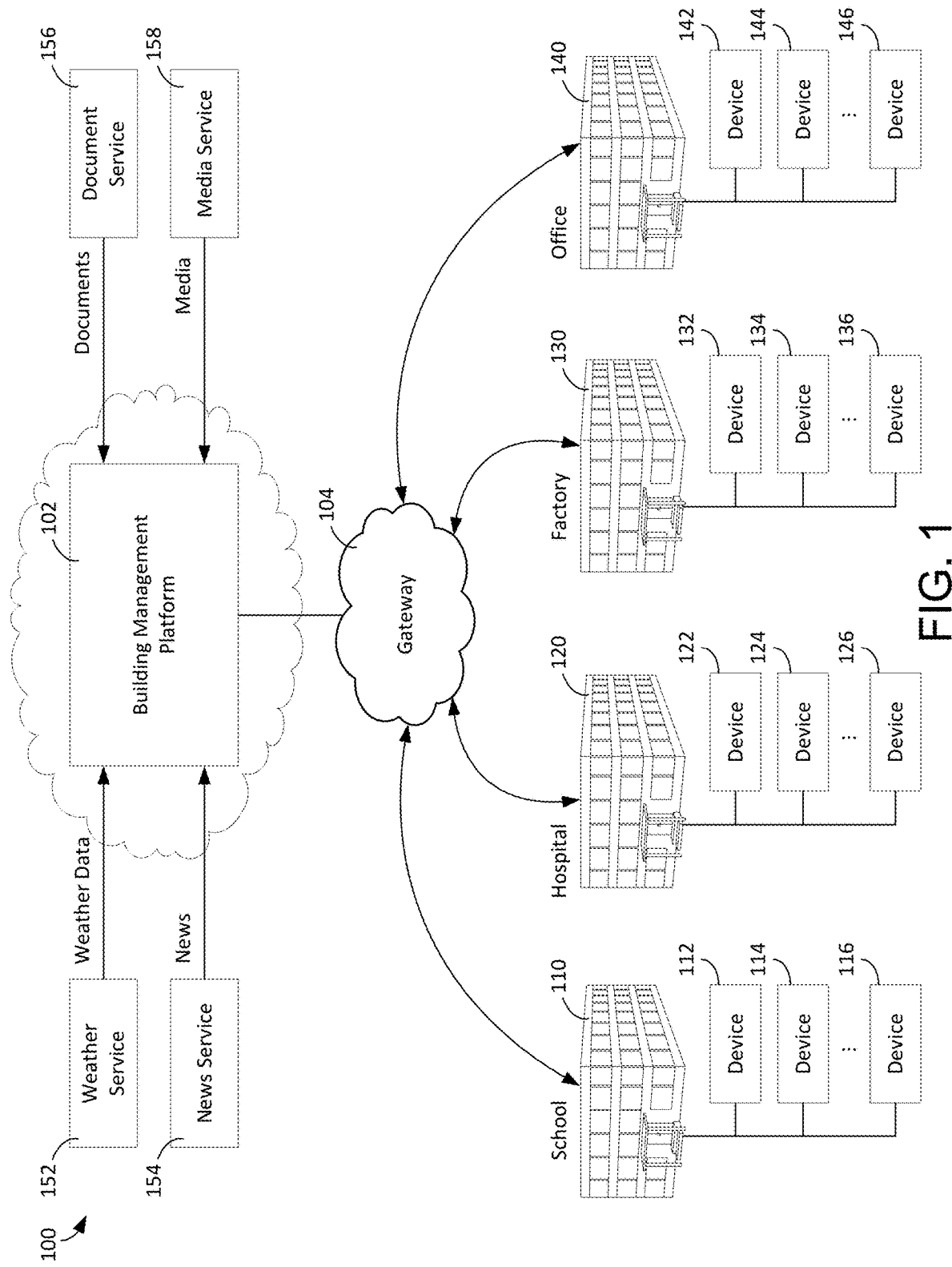
FIG. 1 is a block diagram of a building environment, according to some embodiments.

Hereinafter, example embodiments will be described in more detail with reference to the accompanying drawings. FIG. 1 is a block diagram of a building environment 100, according to some exemplary embodiments. Building environment 100 is shown to include a building management platform 102. Building management platform 102 can be configured to collect data from a variety of different data sources. In some embodiments, the building management platform 102 may be implemented as an "agent", or artificial intelligent/machine learning component configured to facilitate communication and collection of data between the variety of different data sources. Each of the data sources may be implemented as, include, or otherwise use respective agents for facilitating communication amongst or between the data sources and building management platform 102. The agents of the building management platform 102 and data sources may include defined channels across which the agents may exchange information, messages, data, etc. amongst each other. Hence, the building management platform 102 and data sources may together form a network of agents to facilitate artificially intelligent exchange and communication of data across various channels. In some embodiments, one or more device(s), component(s), space(s) (and set of devices, components, spaces) within the building management platform 102 and/or building may include a respective agent dedicated to perform various tasks associated therewith. The agents may therefore be dedicated for performing separate functions or tasks. For example, building management platform 102 is shown to collecting data from buildings 110, 120, 130, and 140, each of which may include an agent (or a group of agents corresponding to various building subsystems within the respective building) for facilitating communication amongst or between the data sources. For an example, building may include a school 110, a hospital 120, a factory 130, an office 140, and/or the like. However, the present disclosure is not limited to the number or type of buildings 110, 120, 130, and 140 shown in FIG. 1. For example, in some embodiments, building management platform 102 may be configured to collect data from one or more buildings (e.g., by the agent corresponding to the building management platform 102 from the agent(s) corresponding to the buildings), and the one or more buildings may be the same type of building or may include one or more different types of buildings than that shown in FIG. 1. As new devices/components/spaces/buildings/control loops are added or other incorporated in network, new agents may be dynamically generated for corresponding new devices/components/buildings/spaces/control loops.

Building management platform 102 can be configured to collect data from a variety of devices 112-116, 122-126, 132-136, and 142-146, either directly via network 104 or indirectly via systems or application in the buildings 110, 120, 130, and 140. In some embodiments, the devices 112-116, 122-126, 132-136, and 142-146 are internet of thing (IoT) devices. IoT devices may include a variety of physical devices, sensors, actuators, electronics, vehicles, home appliances, and/or other items having network connectivity which enable IoT devices to communicate with the building management platform 102. For example, IoT devices can include metering devices, smart home hub devices, smart house devices, doorbell cameras, air quality sensors, smart switches, smart lights, smart appliances, garage door openers, smoke detectors, heart monitoring implants, biochip transponders, cameras streaming live feeds, automobiles with built-in sensors, DNA analysis devices, field operation devices, tracking devices for people/vehicles/equipment, networked sensors, wireless sensors, wearable sensors, environmental sensors, RFID gateways and readers, IoT gateway devices, robots and other robotic devices, GPS devices, smart watches, virtual/augmented reality devices, and/or other networked or networkable devices. While the devices described herein are generally referred to as IoT devices, it should be understood that, in various embodiments, the devices referenced in the present disclosure could be any type of devices capable of communicating data over an electronic network.

Examples of environmental sensors include actinometers, air pollution sensors, bedwetting alarms, ceilometers, dew warnings, electrochemical gas sensors, fish counters, frequency domain sensors, gas detectors, energy meters, hook gauge evaporimeters, humistor, hygrometers, leaf sensors, lysimeters, pyranometers, pyrgeometers, psychrometers, rain gauges, rain sensors, seismometers, SNOTEL sensors, snow gauges, soil moisture sensors, stream gauges, and tide gauges. Example of flow and fluid velocity sensors include air flow meters, anemometers, flow sensors, gas meters, mass flow sensors, and water meters.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, electromagnetic reflection sensors, motion detectors, occupancy sensors, proximity sensors, passive infrared sensors, reed switches, stud finders, triangulation sensors, touch switches, and wired gloves.

Examples of thermal, heat, and temperature sensors include bolometers, bimetallic strips, calorimeters, exhaust gas temperature gauges, flame detections, Gardon gauges, Golay cells, heat flux sensors, infrared thermometers, microbolometers, microwave radiometers, net radiometers, quartz thermometers, resistance thermometers, silicon bandgap temperature sensors, special sensor microwave/imagers, temperature gauges, thermistors, thermocouples, thermometers, and pyrometers. Examples of proximity and presence sensors include alarm sensors, electromagnetic reflection sensors, motion detectors, occupancy sensors, proximity sensors, passive infrared sensors, reed switches, stud finders, triangulation sensors, touch switches, and wired gloves.

In some embodiments, different sensors send measured or other data to building management platform 102 using a variety of different communications protocols or data formats. Building management platform 102 can be configured to ingest sensor data received in any protocol or data format to translate the inbound sensor data into a common data format. Building management platform 102 can create a sensor object smart entity for each sensor that communicates with the building management platform 102. Each sensor object smart entity may include one or more static attributes that describe the corresponding sensor, one or more dynamic attributes that indicate the most recent values collected by the sensor, and/or one or more relational attributes that relate sensors object smart entities to each other and/or to other types of smart entities (e.g., space entities, system entities, data entities, etc.).

In some embodiments, the building management platform 102 may store sensor data using data entities. Each data entity may correspond to a particular sensor and may include a timeseries of data values received from the corresponding sensor. In some embodiments, building management platform 102 stores relational entities that define relationship between sensor object entities and the corresponding data entity. For example, each relational entity may identify a particular sensor object entity, a particular data entity, and may define a link between such entities.

Building management platform 102 can collect data from a variety of external systems or services. For example, building management platform 102 is shown receiving weather data from a weather service 152, news data from a news service 154, documents and other document related data from a document service 156, and media (e.g., video, images, audio, social medial, etc.) from a media service 158 (hereinafter collectively referred as third-party service). In some embodiments, building management platform 102 generated data internally. For example, building management platform 102 may include a web advertising system, a website traffic monitoring system, a web sales system, or other types of platform services that generate data. The data generated by building management platform 102 can be collected, stored, and processed along with the data received from other data sources. Building management platform 102 can collect data directly from external systems or devices or via a network 104 (e.g., a WAN, the internet, a cellular network, etc.). Building management platform 102 can process and transform collected data to generate timeseries data and entity data. Several features of building management platform 102 are describes in more detail below.

Building HVAC Systems and Building Management Systems

Figure 2:
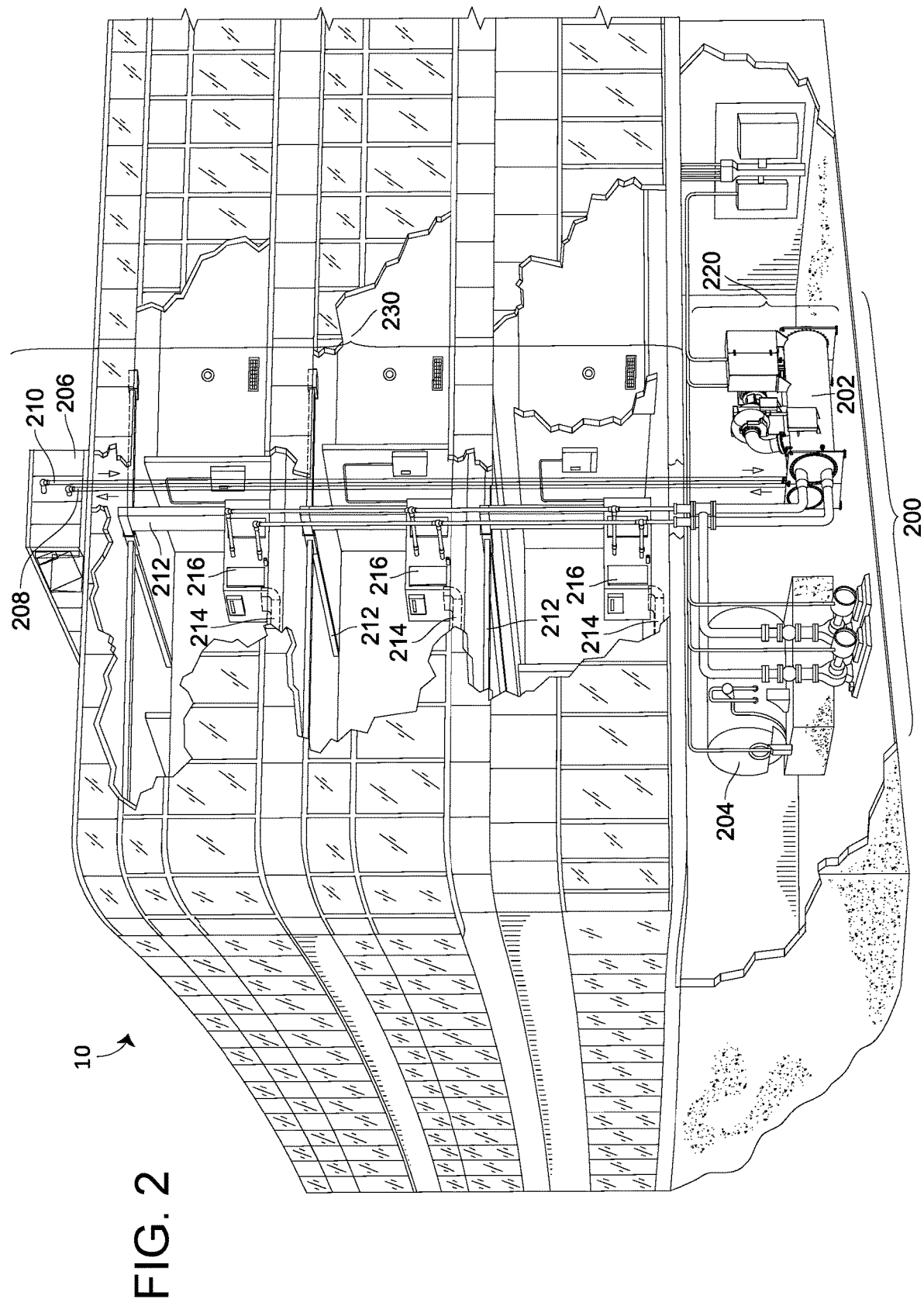
FIG. 2 is perspective view of a building of FIG. 1, according to some embodiments.
Figure 3:
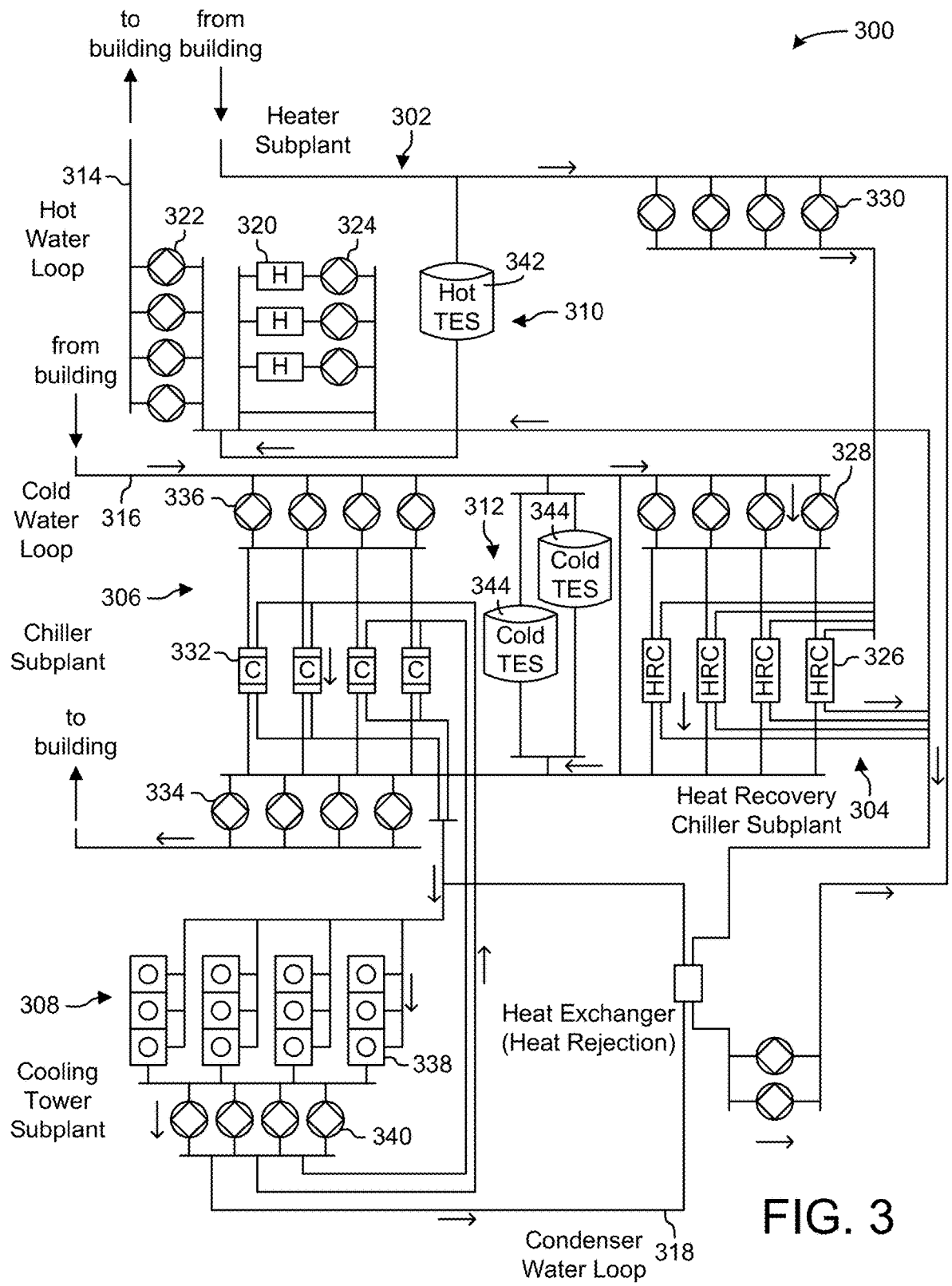
FIG. 3 is a block diagram of a waterside system, according to some embodiments.
Figure 4:
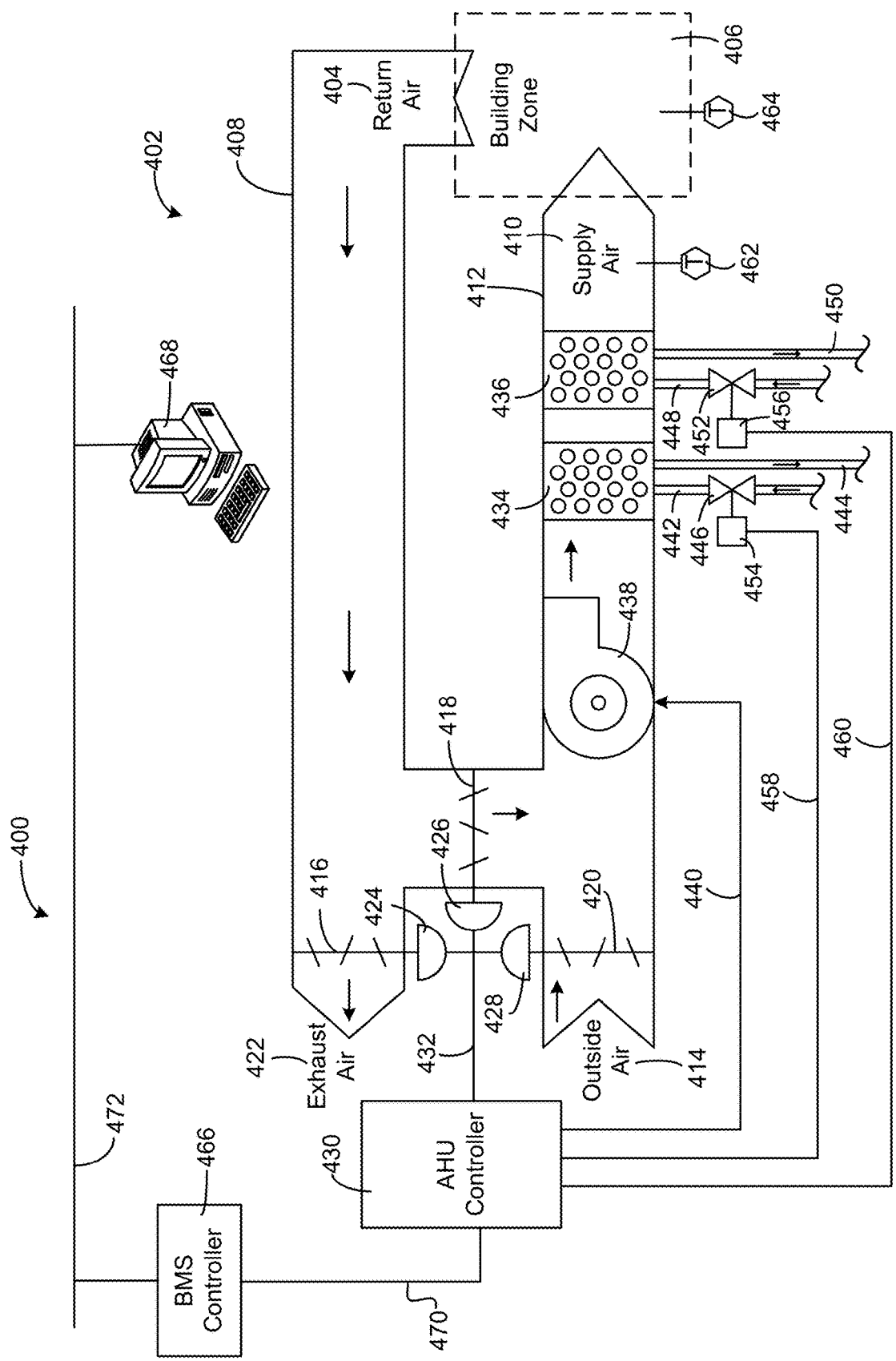
FIG. 4 is a block diagram of an airside system, according to some embodiments.
Figure 5:
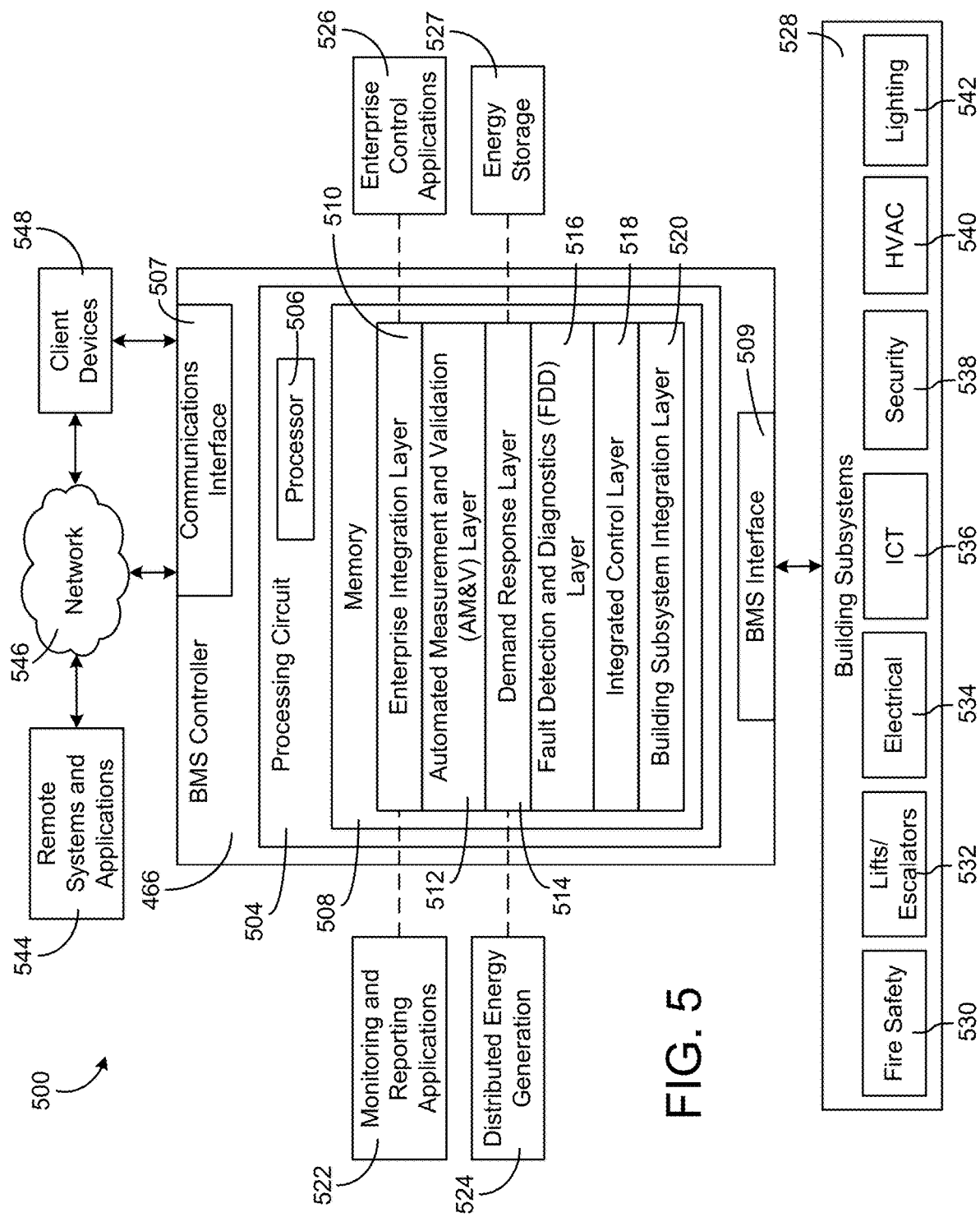
FIG. 5 is a block diagram of a building management system, according to some embodiments.

Referring now to FIGS. 2-5, several building management systems (BMS) and HVAC systems in which the system and methods of the present disclosure can be implemented are shown, according to some embodiments. In brief overview, FIG. 2 shows a building 10 equipped with, for example, a HVAC system 200. Building 10 may be any of the buildings 110, 120, 130, and 140 as shown in FIG. 1, or may be any other suitable building that is communicatively connected to building management platform 102. FIG. 3 is a block diagram of a waterside system 300 which can be used to serve building 10. FIG. 4 is a block diagram of an airside system 400 which can be used to serve building 10. FIG. 5 is a block diagram of a building management system (BMS) which can be used to monitor and control building 10.

Referring particularly to FIG. 2, a perspective view of building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems.

The BMS that serves building 10 includes a HVAC system 200. HVAC system 200 can include HVAC devices (e.g., heaters, chillers, air handling units, pumps, fans, thermal energy storage, etc.) configured to provide heating, cooling, ventilation, or other services for building 10. For example, HVAC system 200 is shown to include a waterside system 220 and an airside system 230. Waterside system 220 may provide a heated or chilled fluid to an air handling unit of airside system 230. Airside system 230 may use the heated or chilled fluid to heat or cool an airflow provided to building 10. An exemplary waterside system and airside system which can be used in HVAC system 200 are described in greater detail with reference to FIGS. 3 and 4.

HVAC system 200 is shown to include a chiller 202, a boiler 204, and a rooftop air handling unit (AHU) 206. Waterside system 220 may use boiler 204 and chiller 202 to heat or cool a working fluid (e.g., water, glycol, etc.) and may circulate the working fluid to AHU 206. In various embodiments, the HVAC devices of waterside system 220 can be located in or around building 10 (as shown in FIG. 2) or at an offsite location such as a central plant (e.g., a chiller plant, a steam plant, a heat plant, etc.). The working fluid can be heated in boiler 204 or cooled in chiller 202, depending on whether heating or cooling is required in building 10. Boiler 204 may add heat to the circulated fluid, for example, by burning a combustible material (e.g., natural gas) or using an electric heating element. Chiller 202 may place the circulated fluid in a heat exchange relationship with another fluid (e.g., a refrigerant) in a heat exchanger (e.g., an evaporator) to absorb heat from the circulated fluid. The working fluid from chiller 202 and/or boiler 204 can be transported to AHU 206 via piping 208.

AHU 206 may place the working fluid in a heat exchange relationship with an airflow passing through AHU 206 (e.g., via one or more stages of cooling coils and/or heating coils). The airflow can be, for example, outside air, return air from within building 10, or a combination of both. AHU 206 may transfer heat between the airflow and the working fluid to provide heating or cooling for the airflow. For example, AHU 206 can include one or more fans or blowers configured to pass the airflow over or through a heat exchanger containing the working fluid. The working fluid may then return to chiller 202 or boiler 204 via piping 210.

Airside system 230 may deliver the airflow supplied by AHU 206 (i.e., the supply airflow) to building 10 via air supply ducts 212 and may provide return air from building 10 to AHU 206 via air return ducts 214. In some embodiments, airside system 230 includes multiple variable air volume (VAV) units 216. For example, airside system 230 is shown to include a separate VAV unit 216 on each floor or zone of building 10. VAV units 216 can include dampers or other flow control elements that can be operated to control an amount of the supply airflow provided to individual zones of building 10. In other embodiments, airside system 230 delivers the supply airflow into one or more zones of building 10 (e.g., via supply ducts 212) without using intermediate VAV units 216 or other flow control elements. AHU 206 can include various sensors (e.g., temperature sensors, pressure sensors, etc.) configured to measure attributes of the supply airflow. AHU 206 may receive input from sensors located within AHU 206 and/or within the building zone and may adjust the flow rate, temperature, or other attributes of the supply airflow through AHU 206 to achieve setpoint conditions for the building zone.

Waterside System

Now referring to FIG. 3, a block diagram of a waterside system 300 is shown, according to some embodiments. In various embodiments, waterside system 300 may supplement or replace waterside system 220 in HVAC system 200 or can be implemented separate from HVAC system 200. When implemented in HVAC system 200 (e.g., boiler 204, chiller 202, pumps, valves, etc.) and may operate to supply a heated or chilled fluid to AHU 206. The HVAC devices of waterside system 300 can be located within building 10 (e.g., as components of waterside system 220) or at an offsite location such as a central plant.

In FIG. 3, waterside system 300 is shown as a central plant having subplants 302-312. Subplants 302-312 are shown to include a heater subplant 302, a heat recovery chiller subplant 304, a chiller subplant 306, a cooling tower subplant 308, a hot thermal energy storage (TES) subplant 310, and a cold thermal energy storage (TES) subplant 312. Subplants 302-312 consume resources (e.g., water, natural gas, electricity, etc.) from utilities to serve thermal energy loads (e.g., hot water, cold water, heating, cooling, etc.) of a building or campus. For example, heater subplant 302 can be configured to heat water in a hot water loop 314 that circulates the hot water between heater subplant 302 and building 10. Chiller subplant 306 can be configured to chill water in a cold-water loop 316 that circulates the cold water between chiller subplant 306 and building 10. Heat recovery chiller subplant 304 can be configured to transfer heat from cold water loop 316 to hot water loop 314 to provide additional heating for the hot water and additional cooling for the cold water. Condenser water loop 318 may absorb heat from the cold water in chiller subplant 306 and reject the absorbed heat in cooling tower subplant 308 or transfer the absorbed heat to hot water loop 314. Hot TES subplant 310 and cold TES subplant 312 may store hot and cold thermal energy, respectively, for subsequent use.

Hot water loop 314 and cold-water loop 316 may deliver the heated and/or chilled water to air handlers located on the rooftop of building 10 (e.g., AHU 206) or to individual floors or zones of building 10 (e.g., VAV units 216). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 302-312 to receive further heating or cooling.

Although subplant 302-312 are shown and described as heating and cooling water for circulation to a building, it is understood that any other type of working fluid (e.g., glycol, CO2, etc.) can be used in place of or in addition to water to serve thermal energy loads. In other embodiments, subplants 302-312 may provide heating and/or cooling directly to the building or campus without requiring an intermediate heat transfer fluid. These and other variations to waterside system 300 are within the teachings of the present disclosure.

Each of subplants 302-312 can include a variety of equipment configured to facilitate the functions of the subplant. For example, heater subplant 302 is shown to include heating elements 320 (e.g., boilers, electric heaters, etc.) configured to add heat to the hot water in hot water loop 314. Heater subplant 302 is also shown to include several pumps 322 and 324 configured to circulate the hot water in hot water loop 314 and to control the flow rate of the hot water through individual heating elements 320. Chiller subplant 306 is shown to include chillers 332 configured to remove heat from the cold water in cold water loop 316. Chiller subplant 306 is also shown to include several pumps 334 and 336 configured to circulate the cold water in cold water loop 316 and to control the flow rate of the cold water through individual chillers 332.

Heat recovery chiller subplant 304 is shown to include heat recovery heat exchangers 326 (e.g., refrigeration circuits) configured to transfer heat from cold water loop 316 to hot water loop 314. Heat recovery chiller subplant 304 is also shown to include several pumps 328 and 330 configured to circulate the hot water and/or cold water through heat recovery heat exchangers 326 and to control the flow rate of the water through individual heat recovery heat exchangers 326. Cooling tower subplant 308 is shown to include cooling towers 338 configured to remove heat from the condenser water in condenser water loop 318. Cooling tower subplant 308 is also shown to include several pumps 340 configured to circulate the condenser water in condenser water loop 318 and to control the flow rate of the condenser water through individual cooling towers 338.

Hot TES subplant 310 is shown to include a hot TES tank 342 configured to store the hot water for later use. Hot TES subplant 310 may also include one or more pumps or valves configured to control the flow rate of the hot water into or out of hot TES tank 342. Cold TES subplant 312 is shown to include cold TES tanks 344 configured to store the cold water for later use. Cold TES subplant 312 may also include one or more pumps or valves configured to control the flow rate of the cold water into or out of cold TES tanks 344.

In some embodiments, one or more of the pumps in waterside system 300 (e.g., pumps 322, 324, 328, 330, 334, 336, and/or 340) or pipelines in waterside system 300 include an isolation valve associated therewith. Isolation valves can be integrated with the pumps or positioned upstream or downstream of the pumps to control the fluid flows in waterside system 300. In various embodiments, waterside system 300 can include more, fewer, or different types of devices and/or subplants based on the particular configuration of waterside system 300 and the types of loads served by waterside system 300.

Airside System

Referring now to FIG. 4, a block diagram of an airside system 400 is shown, according to some embodiments. In various embodiments, airside system 400 may supplement or replace airside system 230 in HVAC system 200 or can be implemented separate from HVAC system 200. When implemented in HVAC system 200, airside system 400 can include a subset of the HVAC devices in HVAC system 200 (e.g., AHU 206, VAV units 216, ducts 212-214, fans, dampers, etc.) and can be located in or around building 10. Airside system 400 may operate to heat or cool an airflow provided to building 10 using a heated or chilled fluid provided by waterside system 300.

In FIG. 4, airside system 400 is shown to include an economizer-type air handling unit (AHU) 402. Economizer-type AHUs vary the amount of outside air and return air used by the air handling unit for heating or cooling. For example, AHU 402 may receive return air 404 from building zone 406 via return air duct 408 and may deliver supply air 410 to building zone 406 via supply air duct 412. In some embodiments, AHU 402 is a rooftop unit located on the roof of building 10 (e.g., AHU 206 as shown in FIG. 2) or otherwise positioned to receive both return air 404 and outside air 414. AHU 402 can be configured to operate exhaust air damper 416, mixing damper 418, and outside air damper 420 to control an amount of outside air 414 and return air 404 that combine to form supply air 410. Any return air 404 that does not pass-through mixing damper 418 can be exhausted from AHU 402 through exhaust damper 416 as exhaust air 422.

Each of dampers 416-420 can be operated by an actuator. For example, exhaust air damper 416 can be operated by actuator 424, mixing damper 418 can be operated by actuator 426, and outside air damper 420 can be operated by actuator 428. Actuators 424-428 may communicate with an AHU controller 430 via a communications link 432. Actuators 424-428 may receive control signals from AHU controller 430 and may provide feedback signals to AHU controller 430. Feedback signals can include, for example, an indication of a current actuator or damper position, an amount of torque or force exerted by the actuator, diagnostic information (e.g., results of diagnostic tests performed by actuators 424-428), status information, commissioning information, configuration settings, calibration data, and/or other types of information or data that can be collected, stored, or used by actuators 424-428. AHU controller 430 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 424-428.

Still referring to FIG. 4, AHU 304 is shown to include a cooling coil 434, a heating coil 436, and a fan 438 positioned within supply air duct 412. Fan 438 can be configured to force supply air 410 through cooling coil 434 and/or heating coil 436 and provide supply air 410 to building zone 406. AHU controller 430 may communicate with fan 438 via communications link 440 to control a flow rate of supply air 410. In some embodiments, AHU controller 430 controls an amount of heating or cooling applied to supply air 410 by modulating a speed of fan 438.

Cooling coil 434 may receive a chilled fluid from waterside system 300 (e.g., from cold water loop 316) via piping 442 and may return the chilled fluid to waterside system 300 via piping 444. Valve 446 can be positioned along piping 442 or piping 444 to control a flow rate of the chilled fluid through cooling coil 434. In some embodiments, cooling coil 434 includes multiple stages of cooling coils that can be independently activated and deactivated (e.g., by AHU controller 430, by BMS controller 466, etc.) to modulate an amount of cooling applied to supply air 410.

Heating coil 436 may receive a heated fluid from waterside system 300 (e.g., from hot water loop 314) via piping 448 and may return the heated fluid to waterside system 300 via piping 450. Valve 452 can be positioned along piping 448 or piping 450 to control a flow rate of the heated fluid through heating coil 436. In some embodiments, heating coil 436 includes multiple stages of heating coils that can be independently activated and deactivated (e.g., by AHU controller 430, by BMS controller 466, etc.) to modulate an amount of heating applied to supply air 410.

Each of valves 446 and 452 can be controlled by an actuator. For example, valve 446 can be controlled by actuator 454 and valve 452 can be controlled by actuator 456. Actuators 454-456 may communicate with AHU controller 430 via communications links 458-460. Actuators 454-456 may receive control signals from AHU controller 430 and may provide feedback signals to controller 430. In some embodiments, AHU controller 430 receives a measurement of the supply air temperature from a temperature sensor 462 positioned in supply air duct 412 (e.g., downstream of cooling coil 434 and/or heating coil 436). AHU controller 430 may also receive a measurement of the temperature of building zone 406 from a temperature sensor 464 located in building zone 406.

In some embodiments, AHU controller 430 operates valves 446 and 452 via actuators 454-456 to modulate an amount of heating or cooling provided to supply air 410 (e.g., to achieve a setpoint temperature for supply air 410 or to maintain the temperature of supply air 410 within a setpoint temperature range). The positions of valves 446 and 452 affect the amount of heating or cooling provided to supply air 410 by cooling coil 434 or heating coil 436 and may correlate with the amount of energy consumed to achieve a desired supply air temperature. AHU controller 430 may control the temperature of supply air 410 and/or building zone 406 by activating or deactivating coils 434-436, adjusting a speed of fan 438, or a combination of both.

Still referring to FIG. 4, airside system 400 is shown to include a building management system (BMS) controller 466 and a client device 468. BMS controller 466 can include one or more computer systems (e.g., servers, supervisory controllers, subsystem controllers, etc.) that serve as system level controllers, application or data servers, head nodes, or master controllers for airside system 400, waterside system 300, HVAC system 200, and/or other controllable systems that serve building 10. BMS controller 466 may communicate with multiple downstream building systems or subsystems (e.g., HVAC system 200, a security system, a lighting system, waterside system 300, etc.) via a communications link 470 according to like or disparate protocols (e.g., LON, BACnet, etc.). In various embodiments, AHU controller 430 and BMS controller 466 can be separate (as shown in FIG. 4) or integrated. In an integrated implementation, AHU controller 430 can be a software module configured for execution by a processor of BMS controller 466.

In some embodiments, AHU controller 430 receives information from BMS controller 466 (e.g., commands, setpoints, operating boundaries, etc.) and provides information to BMS controller 466 (e.g., temperature measurements, valve or actuator positions, operating statuses, diagnostics, etc.). For example, AHU controller 430 may provide BMS controller 466 with temperature measurements from temperature sensors 462-464, equipment on/off states, equipment operating capacities, and/or any other information that can be used by BMS controller 466 to monitor or control a variable state or condition within building zone 406.

Client device 468 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 200, its subsystems, and/or devices. Client device 468 can be a computer workstation, a client terminal, a remote or local interface, or any other type of user interface device. Client device 468 can be a stationary terminal or a mobile device. For example, client device 468 can be a desktop computer, a computer server with a user interface, a laptop computer, a tablet, a smartphone, a PDA, or any other type of mobile or nonmobile device. Client device 468 may communicate with BMS controller 466 and/or AHU controller 430 via communications link 472.

Building Management System

Referring now to FIG. 5, a block diagram of a building management system (BMS) 500 is shown, according to some embodiments. BMS 500 can be implemented in building 10 to automatically monitor and control various building functions. BMS 500 is shown to include BMS controller 466 and building subsystems 528. Building subsystems 528 are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

Each of building subsystems 528 can include any number of devices (e.g., IoT devices), sensors, controllers, and connections for completing its individual functions and control activities. HVAC subsystem 540 can include many of the same components as HVAC system 200, as described with reference to FIGS. 2-4. For example, HVAC subsystem 540 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 542 can include any number of light fixtures, ballasts, lighting sensors, dimmers, or other devices configured to controllably adjust the amount of light provided to a building space. Security subsystem 538 can include occupancy sensors, video surveillance cameras, digital video recorders, video processing servers, intrusion detection devices, access control devices and servers, or other security-related devices.

Still referring to FIG. 5, BMS controller 466 is shown to include a communications interface 507 and a BMS interface 509. Communications Interface 507 may facilitate communications between BMS controller 466 and external applications (e.g., monitoring and reporting applications 522, enterprise control applications 526, remote systems and applications 544, applications residing on client devices 548, 3rd party services 550, etc.) for allowing user control, monitoring, and adjustment to BMS controller 466 and/or subsystems 528. Interface 507 may also facilitate communications between BMS controller 466 and client devices 548. BMS interface 509 may facilitate communications between BMS controller 466 and building subsystems 528 (e.g., HVAC, lighting security, lifts, power distribution, business, etc.).

Interfaces 507, 509 can be or include wired or wireless communications interfaces (e.g., jacks, antennas, transmitters, receivers, transceivers, wire terminals, etc.) for conducting data communications with building subsystems 528 or other external systems or devices. In various embodiments, communications via interfaces 507, 509 can be direct (e.g., local wired or wireless communications) or via a communications network 546 (e.g., a WAN, the Internet, a cellular network, etc.). For example, interfaces 507, 509 can include an Ethernet card and port for sending and receiving data via an Ethernet-based communications link or network. In another example, interfaces 507, 509 can include a Wi-Fi transceiver for communicating via a wireless communications network. In another example, one or both of interfaces 507, 509 can include cellular or mobile phone communications transceivers. In one embodiment, communications interface 507 is a power line communications interface and BMS interface 509 is an Ethernet interface. In other embodiments, both communications interface 507 and BMS interface 509 are Ethernet interfaces or are the same Ethernet interface.

Still referring to FIG. 5, BMS controller 466 is shown to include a processing circuit 504 including a processor 506 and memory 508. Processing circuit 504 can be communicably connected to BMS interface 509 and/or communications interface 507 such that processing circuit 504 and the various components thereof can send and receive data via interfaces 507, 509. Processor 506 can be implemented as a general-purpose processor, an application specific integrated circuit (ASIC), one or more field programmable gate arrays (FPGAs), a group of processing components, or other suitable electronic processing components.

Memory 508 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 508 can be or include volatile memory or non-volatile memory. Memory 508 can include database components, object code components, script components, or any other type of information structure for supporting the various activities and information structures described in the present application. According to some embodiments, memory 508 is communicably connected to processor 506 via processing circuit 504 and includes computer code for executing (e.g., by processing circuit 504 and/or processor 506) one or more processes described herein.

In some embodiments, BMS controller 466 is implemented within a single computer (e.g., one server, one housing, etc.). In various other embodiments, BMS controller 466 can be distributed across multiple services or computers (e.g., that can exist in distributed locations). Further, while FIG. 4 shows applications 522 and 526 as existing outside of BMS controller 466, in some embodiments, applications 522 and 526 can be hosted within BMS controller 466 (e.g., within memory 508).

Still referring to FIG. 5, memory 508 is shown to include an enterprise integration layer 510, an automated measurement and validation (AM&V) layer 512, a demand response (DR) layer 514, a fault detection and diagnostics (FDD) layer 516, an integrated control layer 518, and a building subsystem integration later 520. Layers 510-520 can be configured to receive inputs from building subsystems 528 and other data sources, determine improved and/or optimal control actions for building subsystems 528 based on the inputs, generate control signals based on the improved and/or optimal control actions, and provide the generated control signals to building subsystems 528. The following paragraphs describe some of the general functions performed by each of layers 510-520 in BMS 500.

Enterprise integration layer 510 can be configured to serve clients or local applications with information and services to support a variety of enterprise-level applications. For example, enterprise control applications 526 can be configured to provide subsystem-spanning control to a graphical user interface (GUI) or to any number of enterprise-level business applications (e.g., accounting systems, user identification systems, etc.). Enterprise control applications 526 may also or alternatively be configured to provide configuration GUIs for configuring BMS controller 466. In yet other embodiments, enterprise control applications 526 can work with layers 510-520 to improve and/or optimize building performance (e.g., efficiency, energy use, comfort, or safety) based on inputs received at interface 507 and/or BMS interface 509.

Building subsystem integration layer 520 can be configured to manage communications between BMS controller 466 and building subsystems 528. For example, building subsystem integration layer 520 may receive sensor data and input signals from building subsystems 528 and provide output data and control signals to building subsystems 528. Building subsystem integration layer 520 may also be configured to manage communications between building subsystems 528. Building subsystem integration layer 520 translates communications (e.g., sensor data, input signals, output signals, etc.) across multi-vendor/multi-protocol systems.

Demand response layer 514 can be configured to determine (e.g., optimize) resource usage (e.g., electricity use, natural gas use, water use, etc.) and/or the monetary cost of such resource usage to satisfy the demand of building 10. The resource usage determination can be based on time-of-use prices, curtailment signals, energy availability, or other data received from utility providers, distributed energy generation systems 524, energy storage 527 (e.g., hot TES 342, cold TES 344, etc.), or from other sources. Demand response layer 514 may receive inputs from other layers of BMS controller 466 (e.g., building subsystem integration layer 520, integrated control layer 518, etc.). The inputs received from other layers can include environmental or sensor inputs such as temperature, carbon dioxide levels, relative humidity levels, air quality sensor outputs, occupancy sensor outputs, room schedules, electric meter, water meters, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 514 includes control logic for responding to the data and signals it receives. These responses can include communicating with the control algorithms in integrated control layer 518, changing control strategies, changing setpoints, or activating/deactivating building equipment or subsystems in a controlled manner. Demand response layer 514 may also include control logic configured to determine when to utilize stored energy. For example, demand response layer 514 may determine to begin using energy from energy storage 527 just prior to the beginning of a peak use hour.

In some embodiments, demand response layer 514 includes a control module configured to actively initiate control actions (e.g., automatically changing setpoints) which reduce (e.g., minimize) energy costs based on one or more inputs representative of or based on demand (e.g., price, a curtailment signal, a demand level, etc.). In some embodiments, demand response layer 514 uses equipment models to determine an improved and/or optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 514 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 518 can be configured to use the data input or output of building subsystem integration layer 520 and/or demand response later 514 to make control decisions. Due to the subsystem integration provided by building subsystem integration layer 520, integrated control layer 518 can integrate control activities of the subsystems 528 such that the subsystems 528 behave as a single integrated super system. In some embodiments, integrated control layer 518 includes control logic that uses inputs and outputs from building subsystems to provide greater comfort and energy savings relative to the comfort and energy savings that separate subsystems could provide alone. For example, integrated control layer 518 can be configured to use an input from a first subsystem to make an energy-saving control decision for a second subsystem. Results of these decisions can be communicated back to building subsystem integration layer 520.

Integrated control layer 518 is shown to be logically below demand response layer 514. Integrated control layer 518 can be configured to enhance the effectiveness of demand response layer 514 by enabling building subsystems 528 and their respective control loops to be controlled in coordination with demand response layer 514. This configuration may advantageously reduce disruptive demand response behavior relative to conventional systems. For example, integrated control layer 518 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 518 can be configured to provide feedback to demand response layer 514 so that demand response layer 514 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 518 is also logically below fault detection and diagnostics layer 516 and automated measurement and validation layer 512. Integrated control layer 518 can be configured to provide calculated inputs (e.g., aggregations) to these higher levels based on outputs from more than one building subsystem.

Automated measurement and validation (AM&V) layer 512 can be configured to verify that control strategies commanded by integrated control layer 518 or demand response layer 514 are working properly (e.g., using data aggregated by AM&V layer 512, integrated control layer 518, building subsystem integration layer 520, FDD layer 516, or otherwise). The calculations made by AM&V layer 512 can be based on building system energy models and/or equipment models for individual BMS devices or subsystems. For example, AM&V layer 512 may compare a model-predicted output with an actual output from building subsystems 528 to determine an accuracy of the model.

Fault detection and diagnostics (FDD) layer 516 can be configured to provide on-going fault detection for building subsystems 528, building subsystem devices (i.e., building equipment), and control algorithms used by demand response layer 514 and integrated control layer 518. FDD layer 516 may receive data inputs from integrated control layer 518, directly from one or more building subsystems or devices, or from another data source. FDD layer 516 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 516 can be configured to output a specific identification of the faulty component or cause of the fault (e.g., loose damper linkage) using detailed subsystem inputs available at building subsystem integration layer 520. In other exemplary embodiments, FDD layer 516 is configured to provide "fault" events to integrated control layer 518 which executes control strategies and policies in response to the received fault events. According to some embodiments, FDD layer 516 (or a policy executed by an integrated control engine or business rules engine) may shut-down systems or direct control activities around faulty devices or systems to reduce energy waste, extend equipment life, or assure proper control response.

FDD layer 516 can be configured to store or access a variety of different system data stores (or data points for live data). FDD layer 516 may use some content of the data stores to identify faults at the equipment level (e.g., specific chiller, specific AHU, specific terminal unit, etc.) and other content to identify faults at component or subsystem levels. For example, building subsystems 528 may generate temporal (i.e., time-series) data indicating the performance of BMS 500 and the various components thereof. The data generated by building subsystems 528 can include measured or calculated values that exhibit statistical characteristics and provide information about how the corresponding system or process (e.g., a temperature control process, a flow control process, etc.) is performing in terms of error from its setpoint. These processes can be examined by FDD layer 516 to expose when the system begins to degrade in performance and alert a user to repair the fault before it becomes more severe.

Figure 6:
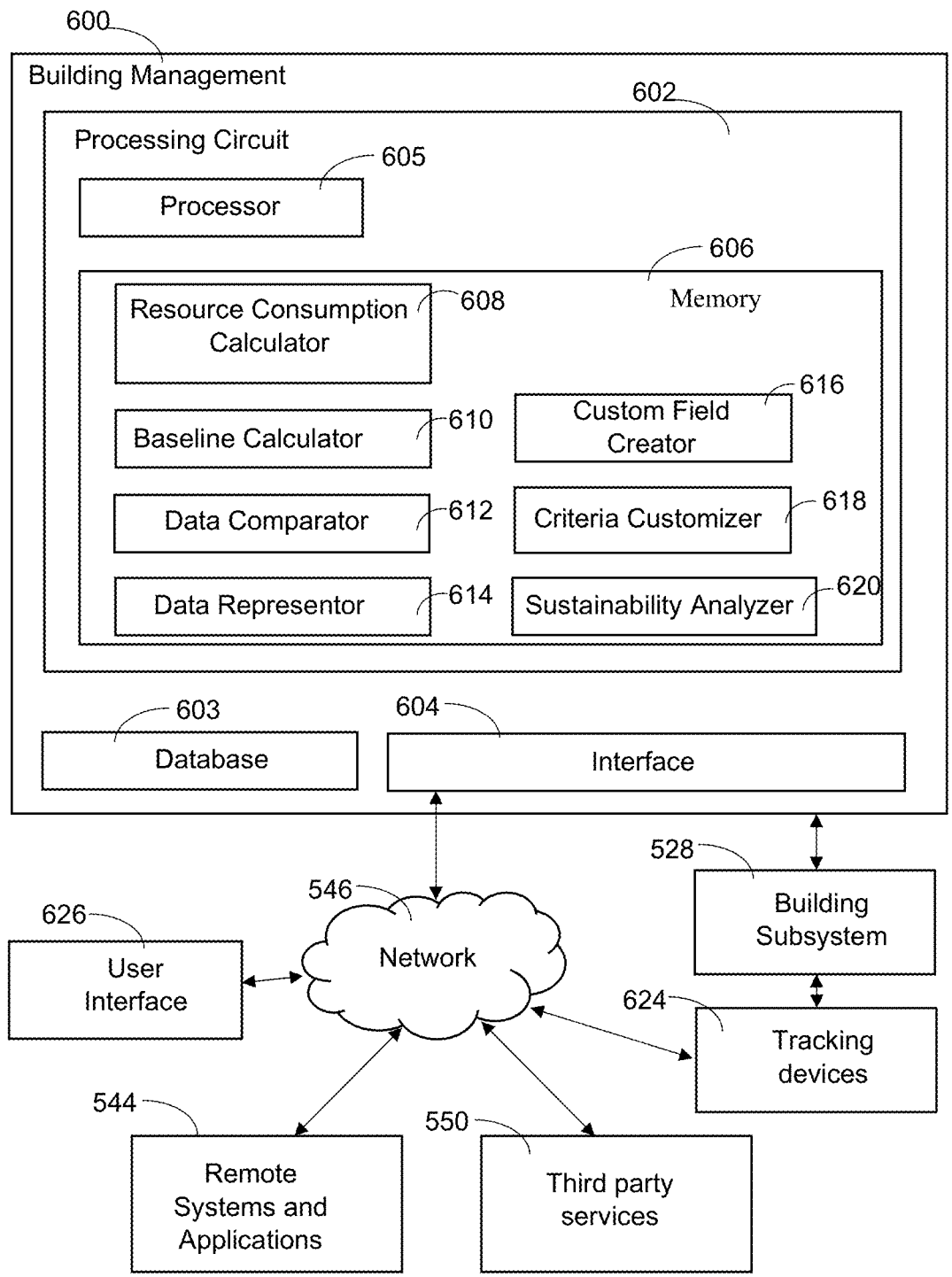
FIG. 6 is a block diagram of another building management system, according to some embodiments.

Now referring to FIG. 6, block diagram of a building management system 600 is shown according to some embodiments. The building management system 600 is shown to include a processing circuit 602, a database 603, and an interface 604. In some embodiments, the interface 604 includes communication interface 507, BMS interface 509, or both. In some other embodiments, the interface 604 is capable of establishing electronic communication with one or more of building subsystems 528, third party services 550, remote systems and applications 544, and user interface 626. The electronic communication may be established via network 546.

In various embodiments, communications via interface 604 can be direct (e.g., local wired or wireless communications) or via a network 546 (e.g., a WAN, the Internet, a cellular network, etc.). For example, interface 604 can include an Ethernet card and port for sending and receiving data via an Ethernet-based communications link or network. In another example, interface 604 can include a Wi-Fi transceiver for communicating via a wireless communications network. In another example, interface 604 can include cellular or mobile phone communications transceivers. In one embodiment, interface 604 can include a power line communications interface and/or an Ethernet interface.

The processing circuit 602 includes a processor 605 and a memory 606. Processing circuit 602 can be communicably connected to interface 604 such that processing circuit 602 and the various components thereof can send and receive data via interface 604. Processor 605 can be implemented as a general-purpose processor, an application specific integrated circuit (ASIC), one or more field programmable gate arrays (FPGAs), a group of processing components, or other suitable electronic processing components.

Memory 606 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 606 can be or include volatile memory or non-volatile memory. Memory 606 can include database components, object code components, script components, or any other type of information structure for supporting the various activities and information structures described in the present application. According to some embodiments, memory 606 is communicably connected to processor 605 via processing circuit 602 and includes computer code for executing (e.g., by processing circuit 602 and/or processor 605) one or more processes described herein.

The processing circuit 602 cooperates with the building subsystems 528 and tracking devices 624. In some embodiments, the tracking devices 624 can be sensors or meters capable of monitoring the utilization of one or more resources (e.g., water, energy, gas, steam, electricity, and the like) by one or more building subsystems 528 or one or more location(s). In some other embodiments, the tracking devices 624 can be one or more devices 112-116, 122-126, 132-136, and 142-146 described above in the preceding sections of this disclosure.

The memory 606, of the processing circuit 602, is shown to include a resource consumption calculator 608. The resource consumption calculator 608 is configured to cooperate with the tracking devices 624 to receive signals that correspond to resource consumption data. In some embodiments, the resource consumption calculator 608 may periodically establish communication with one or more tracking devices 624 via the interface 604. Typically, one or more tracking devices 624 may be associated with a single building sub-system equipment or location. The resource consumption calculator 608 is enabled to determine resource consumption value based on resource consumption data provided by tracking device(s) 624. Each resource consumption value, determined by the resource consumption calculator 608, corresponds to a separate resource, i.e., a separate resource consumption value may be calculated for water, energy, steam, electricity, etc. Further, the resource consumption calculator 608 may timestamp the resource consumption value and store it in the database 603 as historical consumption values for each resource being utilized by building subsystem(s) 528 or location(s). The resource consumption calculator 608 may communicate with the tracking devices 624 as per system defined rules that can be once every few minutes, once in few hours, once per day, once a week, or once a month. The resource consumption calculator 608 may communicate with tracking devices 624 at multiple times which may be separated by a pre-determine time difference to improve accuracy of the system. The pre-determine time difference may be user-defined time difference provided via use interface 626.

In one embodiment, the database 603 may contain location details of each building subsystem 528. The location details may include association of each building subsystem 528 with room(s), floor(s), building(s), and premise(s). For example, the building subsystem 528 may be mapped to a single room or an enclosed space at a lowest level, a floor or a building at intermediate levels, and a premise at higher levels. In one other example, an HVAC unit may be associated with a conference room, a floor having said conference room, a building having said floor, and the premise having said building. Therefore, the resource consumption calculator 608 may while storing the resource consumption value of the building subsystem (HVAC unit in this case) may store the resource consumption value against the location detail as well. In other words, the location details correspond to the space which is catered by the particular building subsystem.

In one non-limiting embodiment, each tracking device 624 may be associated with a particular resource. That is, one tracking device may be responsible for keeping track of electricity consumption and another tracking device may be responsible for keeping track of water consumption. In this case, the tracking device 624 may cooperate with multiple sensors that are configured to provide resource consumption data of varied locations (e.g., multiple sensors configured to determine water consumption data may communicate with the tracking device responsible for keeping track of water consumption). Therefore, in some embodiments, the tracking devices are processor enabled tracking devices capable of processing resource consumption data, wherein the processed resource consumption data is provided to the resource consumption calculator 608.

The resource consumption calculator 608 may be configured to determine resource consumption value for each resource (e.g., water, electricity, steam, and the like) being utilized or consumed by a particular location based on resource consumption data determined by the tracking devices 624 for all building subsystems 528 catering the particular location. For an example, the resource consumption calculator 608 may determine total quantity of water consumed by third floor of the building 10 by determining resource, i.e., water consumption value of building subsystem(s) catering third floor. In one non-limiting embodiments, if a particular building subsystem is catering to multiple floors then the resource consumption calculator 608 may calculate average water consumption per floor being catered by the particular building subsystem. Similarly, the resource consumption calculator 608 is also capable of determining a total quantity of water consumed by the building 10 on basis of water consumption value of building subsystems 528 catering building 10.

Building subsystems 528 (as shown in FIG. 5) are shown to include a building electrical subsystem 534, an information communication technology (ICT) subsystem 536, a security subsystem 538, a HVAC subsystem 540, a lighting subsystem 542, a lift/escalators subsystem 532, and a fire safety subsystem 530. In various embodiments, building subsystems 528 can include fewer, additional, or alternative subsystems. For example, building subsystems 528 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 528 include waterside system 300 and/or airside system 400, as described with reference to FIGS. 3-4.

In some embodiments, the resource consumption calculator 608 may communicate with resource management system(s) affiliated with the building management system 600. The resource management system(s) may provide information pertaining to resource consumption of building subsystems 528 and spaces associated with the building subsystems.

Still referring to FIG. 6, the memory 606 is shown to include a baseline calculator 610 according to some embodiments. The baseline calculator 610 is configured to cooperate with the resource consumption calculator 608 and the database 603. The baseline calculator 610 performs one or more arithmetic operations on historical consumption values for each resource to determine dynamic baseline (shown in subsequent figures). In an embodiment, each resource and location may have a different dynamic baseline that may depend on their respective historical resource consumption values. For example, dynamic baseline for electricity, as a resource, may be calculated separately for building 10 and separately for one or more floors. In some other embodiments, the baseline calculator 610 may be configured to determine dynamic baseline for each building subsystems 528 considering their historical resource consumption values. For an example, dynamic baseline for electricity as resource may be separately calculated for an AHU.

In some embodiments, the baseline calculator 610 is configured to determine dynamic baseline by determining an average of historical resource consumption values. The dynamic baseline may be automatically updated or adjusted by the baseline calculator 610 on regular intervals. The regular intervals may be user-defined intervals. Initially, as per system requirement, the user may define a historical time period that is required to elapse before the baseline calculator 610 automatically determines the dynamic baseline. Once the historical time period has elapsed, the baseline calculator 610 may determine dynamic baseline for the resource and/or location based on historical resource consumption value for the historical time period and store it in the database 603. In an embodiment, the historical time period can range between a couple of days to one or more years. For an example, the historical time period is fifty-two weeks.

In an embodiment, the baseline calculator 610 also communicates with user interface 626 to receive user inputs. For an instance, if user input indicates selection of electricity as a resource and building 10 as location then the baseline calculator 610 cooperates with the database 603 to extract historical resource (electricity) consumption values for building 10 from the database 603. Subsequently, the baseline calculator 610 may determine dynamic baseline by calculating average of historical resource (electricity) consumption values for the historical time period. By default, the baseline calculator 610 may determine dynamic baseline by calculating average resource (electricity) consumption for historical time period of fifty-two weeks. However, this historical time period can be customized by the user via user interface 626. The user interface 626 can be provided via any electronic device having processing and communication capabilities. In some embodiments, the user interface 626 may be provided on client devices 548.

Additionally, in some embodiments, the baseline calculator 610 allows user(s) to pre-define a static baseline for each resource and/or location. The static baseline is, typically, independent of historical consumption values. The user may be allowed to reset the static baseline as and when required. In some embodiments, the user may define different static baselines for different resources and/or locations. In some other embodiments, the user may define a single static baseline for all locations or resources.

Still referring to FIG. 6, the memory 606 is shown to include a data comparator 612. The data comparator 612 is configured to cooperate with the resource consumption calculator 608, the baseline calculator 610, and the database 603. The data comparator 612 is configured to compare resource consumption value with at least one of dynamic baseline and static baseline. In an embodiment, the data comparator 612 may periodically compare resource consumption values with dynamic and/or static baseline. In some embodiments, the data comparator 612 may directly receive resource consumption value from the resource consumption calculator 608 and subsequently compare it with dynamic and/or static baseline. In some other embodiments, the data comparator 612 may retrieve resource consumption value from the database 603 and subsequently compare it with the dynamic and/or static baseline for that resource and location.

In an embodiment, the user is enabled to provide a first threshold and a second threshold for each resource, preferably, via user interface 626. The data comparator 612 is configured to generate a first flag when resource consumption value is less than dynamic and/or static baseline by the first threshold. Generation of first flag represents that the resource consumption value for the particular resource is approaching dynamic and/or static baseline. Further, the data comparator 612 is configured to generate a second flag once the resource consumption value exceeds dynamic and/or static baseline by the second threshold. For an example, first flag may be generated when resource consumption value exceeds dynamic baseline but is approaching static baseline. In one other example, the first flag may be generated when resource consumption value is ten percent less than the static and/or dynamic baseline and the second flag may be generated when resource consumption value exceeds dynamic and/or static baseline by fifteen percent. In this example, ten percent represents first threshold whereas fifteen percent represents second threshold.

In one non-limiting embodiment, the data comparator 612 may generate first flag and second flag once a user-defined criterion pertaining to dynamic and/or static baseline is fulfilled. In some cases, the user-defined criteria for generation of first flag and second flag may be same or different.

Still further, the data comparator 612 is configured to time stamp and store first flag and second flag in the database 603.

As described earlier, dynamic baseline for each resource may vary as per selection of location. For example, dynamic baseline of a particular resource for a room may be different from the dynamic baseline of the particular resource for the building. This may be due to difference in resource consumption by building subsystems 528 affiliated with the room and resource consumption by the building subsystems 528 affiliated with building.

In some embodiments, the data comparator 612 may be configured to compare resource consumption value with dynamic baseline determined for one or more building subsystems, wherein the building subsystem(s) may be selected by the user. The baseline calculator 610 may determine dynamic baseline for selected building subsystem (s) based on their historical resource consumption values. Additionally, the user may provide static baseline for one or more building subsystem(s). In one embodiment, the data comparator 612 may be configured to compare resource consumption value with dynamic and/or static baseline in real time as well as for historical resource consumption values. It is to be noted that while comparing historical resource consumption values, the data comparator 612 may retrieve historical consumption values and dynamic baseline as per timestamp information associated with the historical value. In one embodiment, a custom field creator 616 may allow the user to select one or more building subsystem(s) for analysis.

Further, the memory 606 is shown to include a data representor 614 that is configured to cooperate with the resource consumption calculator 608, the baseline calculator 610, the data comparator 612, and the database 603. The data representor 614 is capable of utilizing resource consumption values, associated dynamic and/or static baselines, and information stored within the database 603 to selectively generate and provide graphical representation for resource consumption analysis via user interface 626. In an embodiment, the resource consumption analysis may be confined to resource(s), location(s) and/or building subsystem(s) 528 selected by the user via custom field creator 616. Additionally, the data representor 614 is configured to generate and superimpose a first indicator (icon) (shown at least in FIG. 10) to represent first flag and a second indicator (icon) (shown at least in FIG. 10) to represent second flag, with the first icon different than the second icon. In an embodiment, both first indicator(s) and second indicator(s) are referred as sustainability indicators.

In an embodiment, the graphical representation can be in form of one or more of, but not limited to, two-dimensional bar graphs, three-dimensional bar graphs, two-dimensional line graphs, three-dimensional line graphs, two-dimensional area, three-dimensional area, histograms, bubble charts, color coded charts, column charts, or any combination thereof.

In some embodiments, the data representor 614 is in communication with user interface 626 typically, via the interface 604. The data representor 614 may communicate with the user interface 626 to receive input data from user(s) wherein the input data may pertain to selection of one or more resource(s), one or more location(s), and one or more building subsystem(s).

Still referring to FIG. 6, the memory 606 is shown to include custom field creator 616. The custom field creator 616 is configured to cooperate with data representor 614 and database 603. The custom field creator 616 allows a user to add, remove, and/or manipulate preferences to tailor graphical representations generated by the data representor 614. In one embodiment, the custom field creator 616 may allow users to add, remove, or manipulate preferences by providing inputs by dragging and dropping, via drop down menu(s), via filter(s), via navigation tree, etc. In one embodiment, the custom field creator 616 may enable the user to compare resource consumption value for more than one resource or define rules and/or conditions to fine tune graphical representations generated by the data representor 614.

Figure 7:
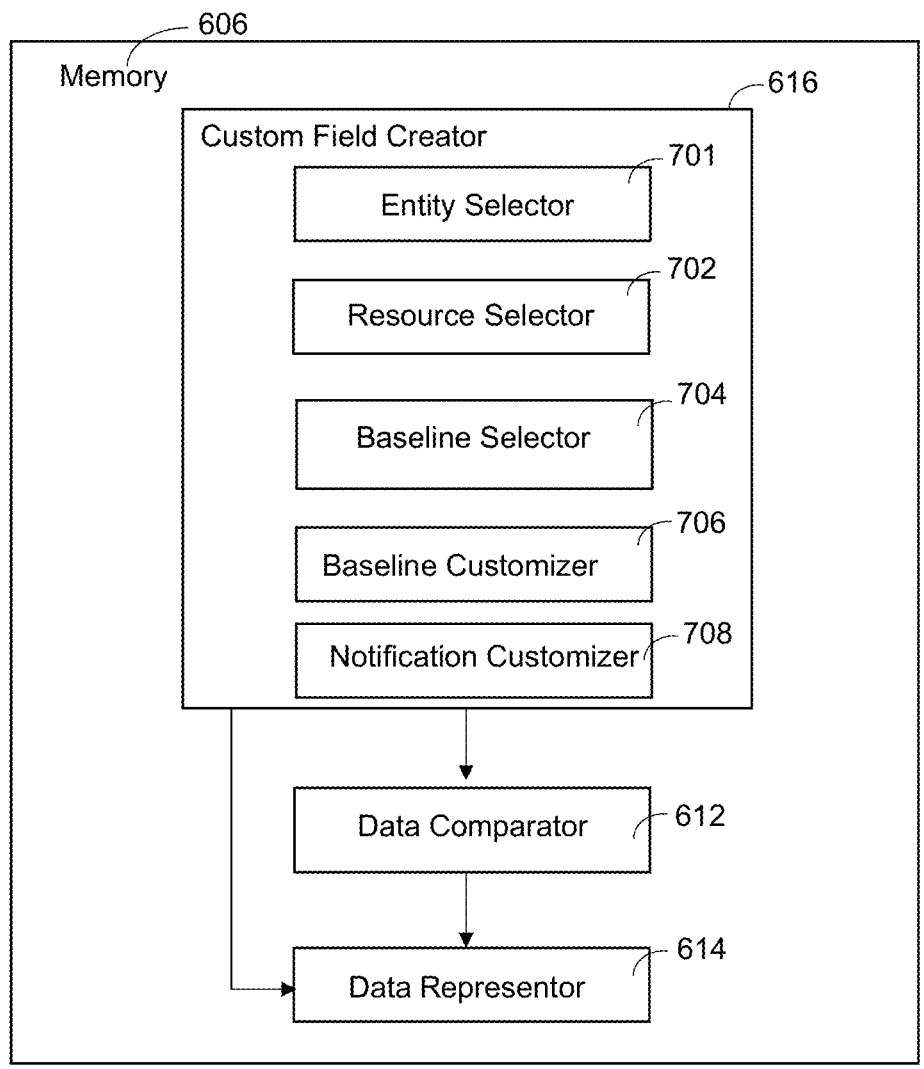
FIG. 7 is a block diagram of a custom field creator of the building management system of FIG. 6, according to some embodiments.

Now referring to FIG. 7 in accordance with FIG. 6, the custom field creator 616 is shown to include an entity selector 701, a resource selector 702, a baseline selector 704, and a baseline customizer 706. Resource selector 702 is configured to allow a user to select one or more resources for analysis, i.e., the user may select a particular resource that he/she wishes to compare with at least one of static baseline and dynamic baseline. Further, the entity selector 701 is configured to allow user(s) to select one or more location(s) for which he/she intends to perform resource consumption analysis. Additionally, the entity selector 701 may allow user(s) to select one or more building subsystem(s) 528 for which he/she intends to perform resource consumption analysis.

Subsequent to selection of one or more resource(s) and one or more location(s)/building subsystem(s), the resource selector 702 is configured to provide information pertaining to the selected resource(s) to data comparator 612 and the entity selector 701 is configured to provide information pertaining to selected location(s) and/or building subsystem(s) to data comparator 612. The data comparator 612 may further compare resource consumption value for the selected resource(s) with static baseline and/or dynamic baseline for the selected location(s) and/or building subsystem(s). In an embodiment, the data comparator 612 may receive resource consumption value for the selected resource(s) and/or selected location(s)/building subsystem(s) from the resource consumption calculator 608. In another embodiment, the data comparator 612 may retrieve resource consumption values including historical resource consumption values for selected resource(s) and/or selected location(s)/building subsystem(s) from the database 603.

Further, the custom field creator 616 is shown to include baseline selector 704. The baseline selector 704 facilitates a user to select one of static baseline or dynamic baseline. In some embodiments, the baseline selector 704 may facilitate the user to select both static baseline and dynamic baseline. The baseline selector 704 is configured to cooperate with the data comparator 612 wherein the data comparator 612 may compare resource consumption value(s) for the resource and/or location selected by the resource selector 702 with baseline, i.e., static and/or dynamic baseline opted by the user via baseline selector 704.

Still further, the custom field creator 616 is shown to include baseline customizer 706. The baseline customizer 706 allows user(s) to provide create static baseline(s) and provided a benchmark value for the static baseline. In an embodiment, if static baseline is already created, the user may be permitted to update benchmark value for the static baseline. The user is, typically, permitted to provide benchmark value for static baseline(s) pertaining to one or more resource(s) and/or location(s). In some embodiments, the baseline customizer 706 may allow user(s) to define a single static baseline for more than one resources. In some other embodiments, the baseline customizer 706 may allow user(s) to define a single static baseline for one or more building subsystem(s) 528 or any combination thereof. Further, the baseline customizer 706 is configured to cooperate with the database 603 and the data comparator 612. The static baseline defined by user using baseline customizer 706 is stored in the database 603 against resource(s) and associated location(s). In an embodiment, static baseline defined by the user(s) may override previously stored static baseline from the database 603.

In some embodiments, the memory 606 includes a criteria customizer 618. The criteria customizer 618 is configured to cooperate with the data comparator 612, the data representor 614, and the database 603. The criteria customizer 618 allows user(s) to provide user-defined criteria for triggering of first flag, second flag, and generation of notifications pertaining to triggering of first flag and/or second flag. The user-defined criteria include providing first threshold and second threshold. In an embodiment, the criteria customizer 618 may allow user(s) to set different first pre-determine percentage and second pre-determined percentage. Similarly, in some embodiments, the criteria customizer 618 may allow user(s) to set same first pre-determine percentage and second pre-determine percentage.

Still further, the criteria customizer 618 facilitates user(s) to set first threshold and second threshold for each resource and/or location separately. Additionally, the user may also be allowed to selectively set first threshold and second threshold for static baseline and dynamic baseline respectively.

In some embodiments, the criteria customizer 618 includes a notification customizer 708. The notification customizer 708 is configured to facilitate selection of one or more modes of notification. The notification may be provided upon generation of at least one of first flag and second flag. The mode may be one or more of, but not limited to, haptic notification, text-based notification, voice-call based notification, audio notification, audio-visual notification, email notification, web-based notification, etc. In some embodiments, the processing circuit 602 may supplement notifications with snapshots of the graphical representations generated by the data representor 614. In some other embodiments, the processing circuit 602 may accompany one or more Uniform Resource Locator (URLs) along with notifications to enable a user to gain access to graphical representations generated by the data representor 614.

Further, the notification customizer 708 is configured to facilitate the user(s) to create a list of recipients those are authorized to keep track of resource consumptions and are required to be intimated about generation of at least one of first flag and/or second flag. Still further, the notification customizer 708 allows a user to add recipient(s) and modify or delete already added recipient(s).

Figure 8:
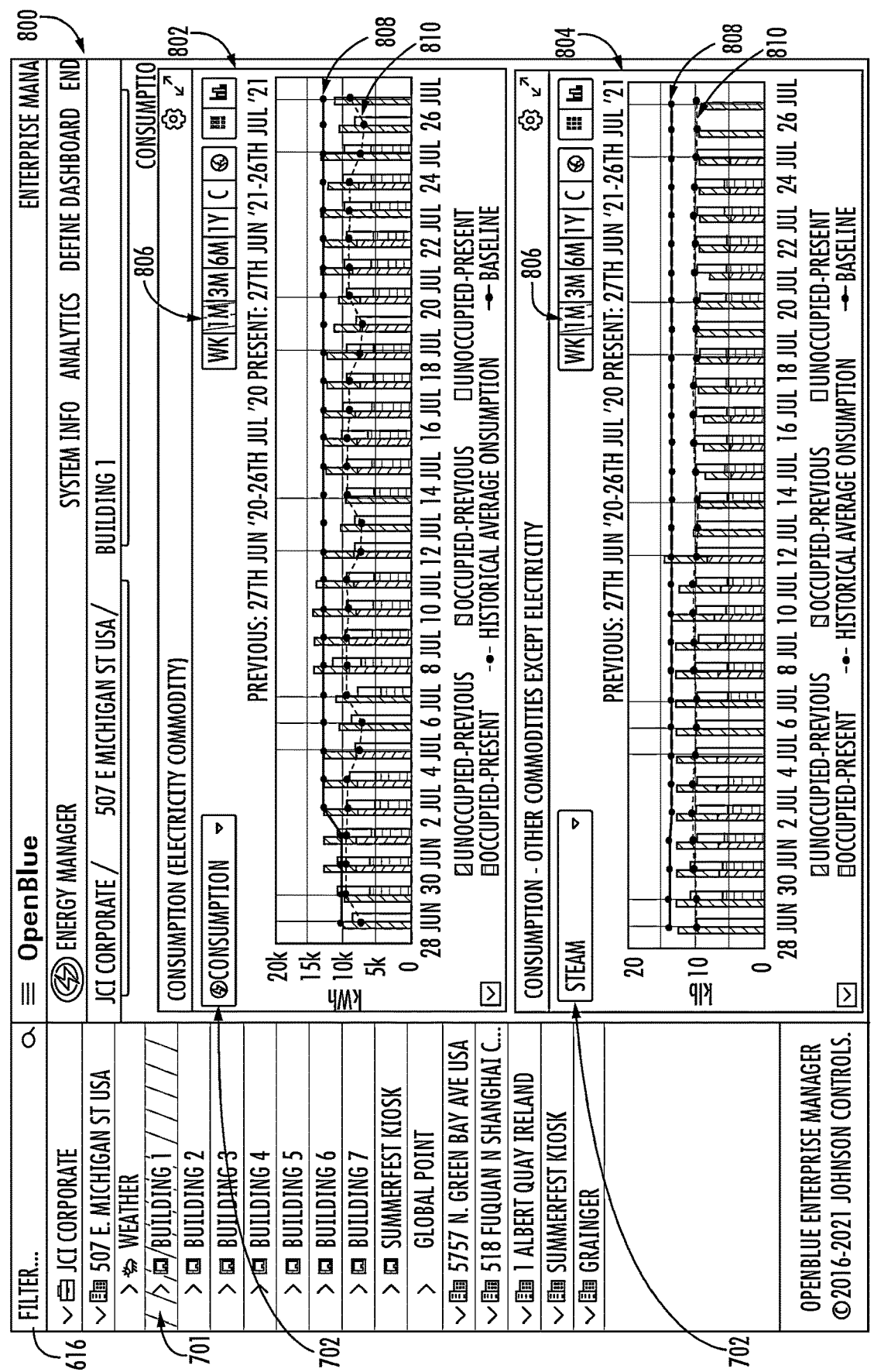
FIG. 8 is a snapshot of a portion of a dashboard providing resource consumption analysis, according to some embodiments.

Now referring to FIG. 8 that illustrates a snapshot of a portion of dashboard 800 depicting resource consumption analysis, according to some embodiments, is shown. As shown, dashboard 800 allows user(s) to select one or more of location(s), building subsystem(s), and resource(s) via custom field creator 616. Specifically, as shown, entity selector 701 provides a list of locations and a list of building subsystem(s) available for user's selection (e.g., Building 1, Building 2, Building 3, Building 4, etc.). Resource selector 702 is shown in form of a drop-down menu that contains a list of resources associated or available for selection of selected location(s) and/or building sub-system(s).

As shown, widget 802 illustrates a graphical representation that provides electricity consumption analysis, in form of graphical representation, for building 1 wherein electricity is selected by the user via resource selector 702 and building 1 is selected via entity selector 701. Similarly, widget 804 provides steam consumption analysis, in form of graphical representation, for building 1 wherein steam is selected by the user via resource selector 702 and building 1 is selected via entity selector 701. Widgets 802 and 804 illustrate graphical representation for building 1's electricity consumption and steam consumption respectively that are generated by data representor 614. Further, resource consumption analysis as shown in widgets 802 and 804 are superimposed with static baseline 808 that may be provided by the user via baseline customizer 706 and dynamic baseline 810 that may be determined by the resource consumption calculator 608.

Figure 9:
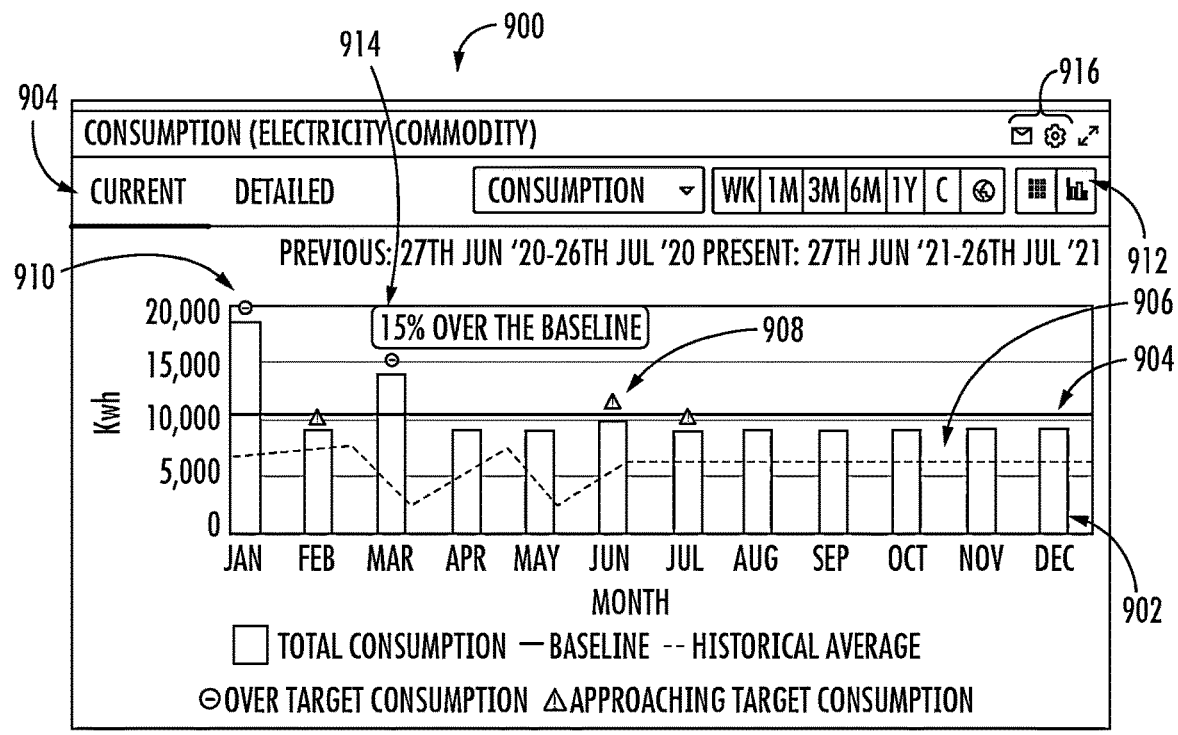
FIGS. 9 and 10 are snapshots of a dashboard providing graphical representations that depicts resource consumption analysis for electricity along with sustainability indicators, according to some embodiments.
Figure 10:
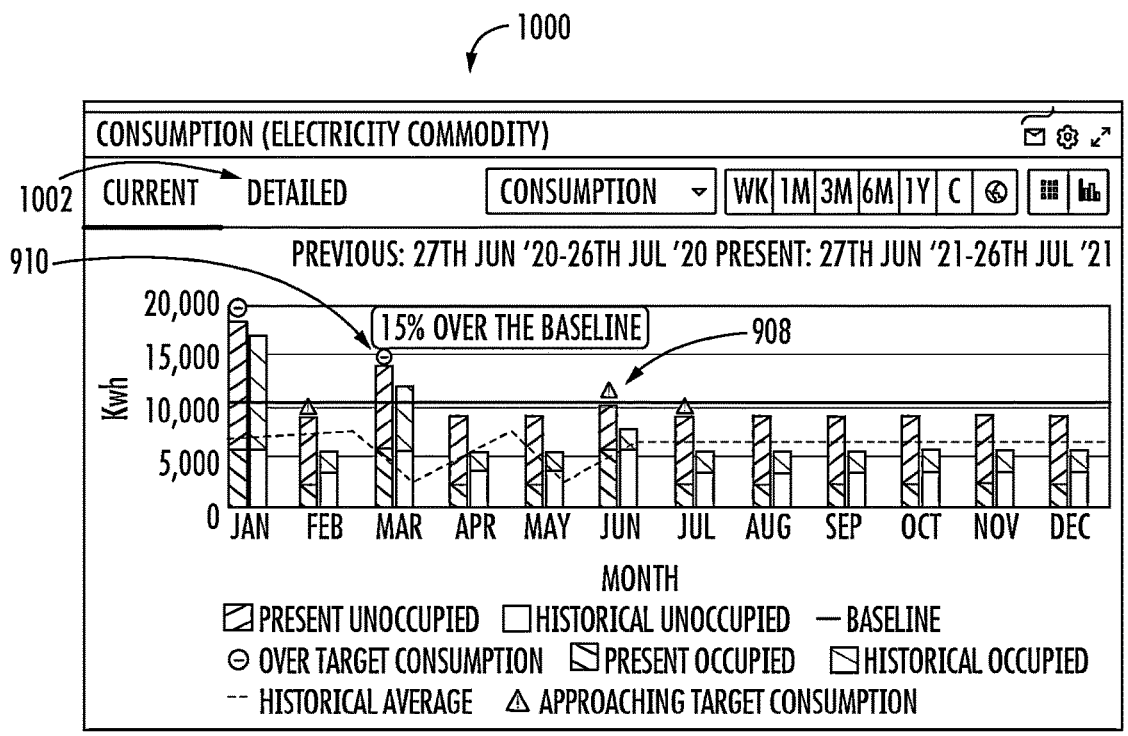

Now referring to FIGS. 9 and 10, according to some embodiments, widgets 900 and 1000 illustrate electricity consumption analysis generated by data representor 614 for a location. For example, the widgets 900 and 1000 may pertain to electricity consumption analysis of building 1 as shown in FIG. 8. In an embodiment, electricity consumption analysis is provided via graphical representation having bar charts generated by data representor 614. Widget 900, as shown in FIG. 9, is restricted to current/present view 904, i.e., simplified view, wherein total energy consumption value is addition of occupied space and unoccupied space.

As shown, the data representor 614 provides graphical representation that contains total electricity consumption along with static baseline 904 and dynamic baseline 906. In this case, the widget 900 represents bar charts containing solid bars 902 for each month. As shown, widget 900 contains first indicators 908 and second indicators 910. The first indicators 908 reflect total resource consumption, i.e., electricity in this case, approaching the static baseline 904 and is below static baseline 904 by first threshold. Similarly, second indicators 910 indicates that total electricity consumption exceeds static baseline 904 by second threshold. In an embodiment, the first indicators 908 and the second indicators 910 may be represented by the data representor 614 in varied forms that can be one of, but not limited to, sizes, shapes, colors, symbols, or any combination thereof. However, referring to FIG. 9, first indicators 908 are triangular in shape and whereas second indicators 910 are circular in shape. In some embodiments, both first indicators 908 and second indicators 910 may have similar shape but different size and/or colors.

Still referring to FIG. 9, widget 900 is shown to provide second indicators 910 against bars 902 for the months of January and March indicating that the total resource consumption, i.e., total electricity consumption, for January and March exceeded static baseline 904 by second threshold. Further, when a user selects or hovers over one of these months, the widget 900 may provide additional information. That is, when the user selects March, the widget 900 pop-ups a text box 914 that provides additional information. The additional information indicates that the total resource consumption in the month of March was above static baseline by second threshold (e.g., fifteen percent).

Similarly, the widget 900 is shown to provide first indicators 908 against solid bars 902 for the months of February, June, and July indicating that the total resource consumption for these months exceeds first threshold and therefore, was approaching static baseline 904.

Further, the widget 900 is shown to include a chart selector tab 912 that may enable the user to provide preferences pertaining to graphical representation of resource consumption. In an embodiment, the user may be allowed to switch between different charts via chart selector tab 912 based on which the data representor 614 may provide or alter graphical representation accordingly.

In one example, considering daily electricity consumption for Building-1. Daily baseline is set to 1500 KWh, first threshold is set to 10 percent, and second threshold is set to 15 percent. Therefore, when daily electricity consumption is 1351 KWh, the system generates first flag and presents first indicator against electricity consumption since 1351 KWh is less than 10 percent of the baseline or exceeds first threshold. Similarly, if the daily electricity consumption is equal to or more than 1725 KWh, then the system 600 generates second flag to present second indicator since electricity consumption for said day exceeded static baseline by 15 percent or second threshold.

In one other example, considering monthly electricity consumption for Building 2. Monthly baseline is set to 30,000 KWh, first threshold is set to 12 percent, and second threshold is set to 10 percent. Therefore, when current month to date total electricity consumption reaches 32,123 KWh, then one or more notification is generated and provided to user(s) indicating total electricity consumption has crossed the baseline of 30,000 KWh. Further, in this case if the total electricity consumption crosses 33,000 KWh then the system will generate second flag based on which second indicator is presented in monthly resource consumption chart and one or more notification is provided to the user(s).

Still referring to FIG. 9, widget 900 is provided with one or more icons 916 (e.g., settings icon, notification icon, etc.). Selection of one of these icons 916 allow user(s) to access criteria customizer 618 to provide one or more of first threshold, second threshold, selection of notification modes, and a list of recipients for notification.

Now referring to FIG. 10, widget 1000 includes all functionalities described with reference to widget 900, shown in FIG. 9. The widget 1000 pertains to a detailed view 1002 wherein graphical representation provides a split view of resource consumption for both present occupied and unoccupied space and historical occupied and unoccupied space. Similar to widget 900, the widget 1000 too displays static baseline (solid line) and dynamic baseline (broken line). It is to be noted that, the first indicator(s) 908 and the second indicator(s) 910 will only be provided against bars that relate to actual current/present consumption.

As shown in FIGS. 9 and 10, the user can select time period for resource consumption analysis. The time period can be week, month, quarter, half year, and year. Widgets 900, 100 provides resource consumption analysis, i.e., electricity consumption analysis for a year wherein each bar represents a month of the year.

Figure 11:
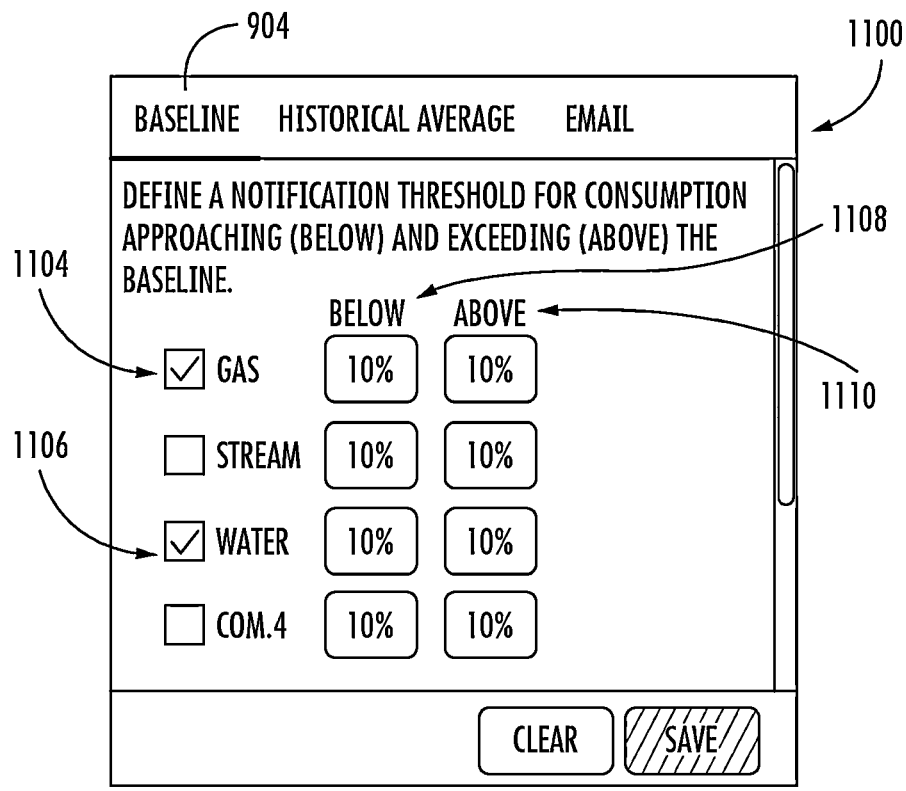
FIGS. 11 and 12 are snapshots of a dashboard allowing user(s) to define criteria for generation of notifications and sustainability indicators, according to some embodiments.
Figure 12:
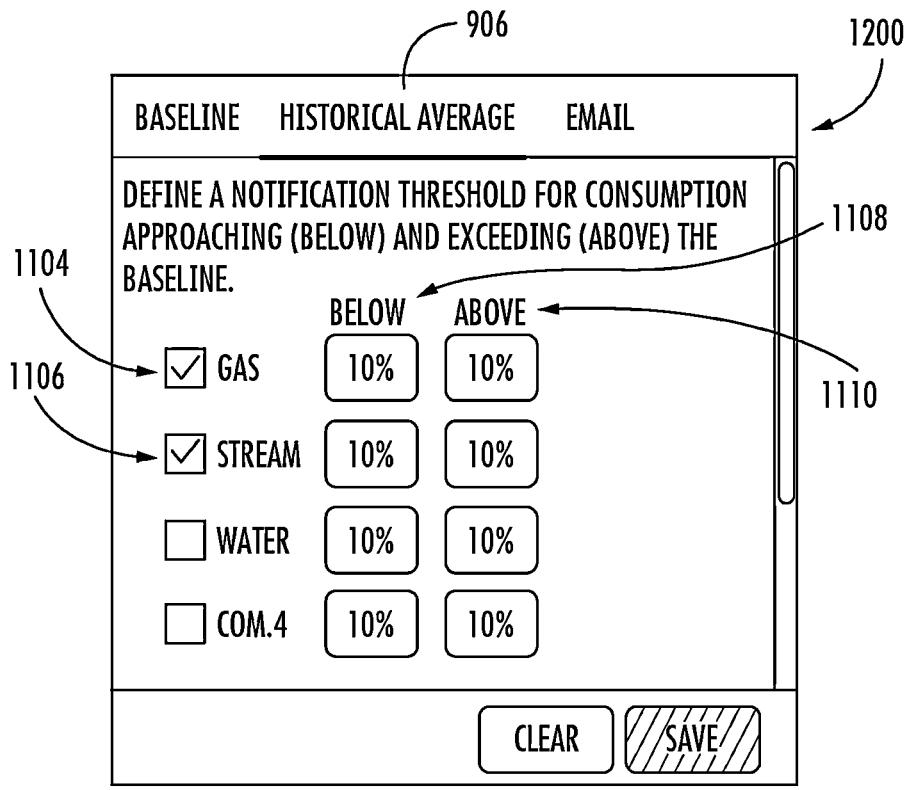
Figure 13:
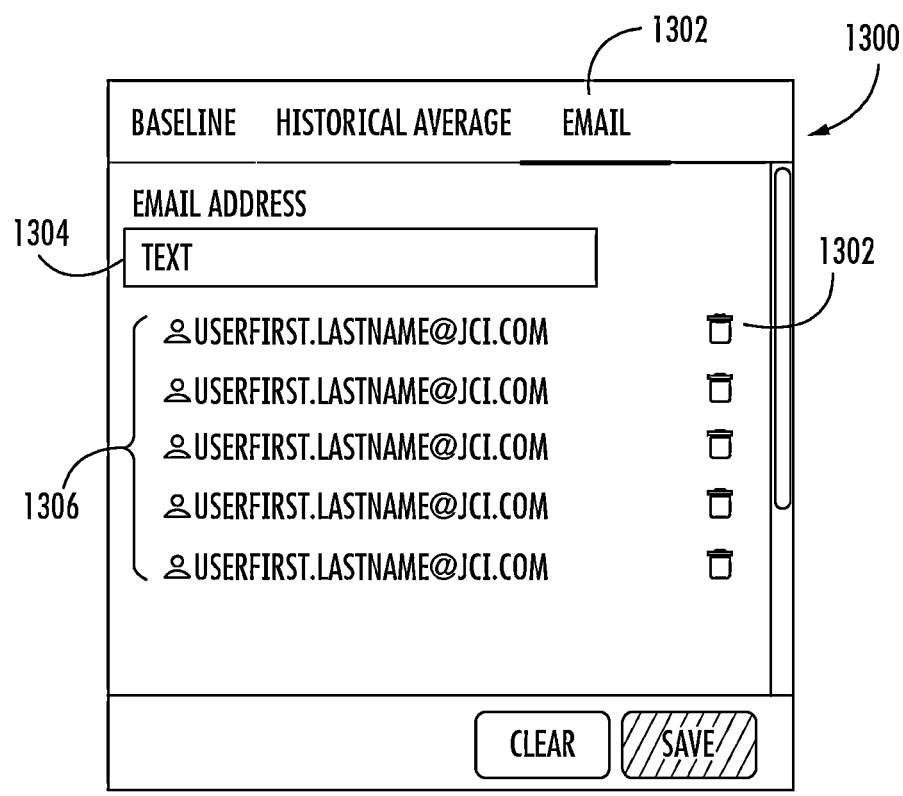
FIG. 13 is a snapshot of a dashboard depicting list of personnel authorized to receive notifications, according to some embodiments.
Figure 16:
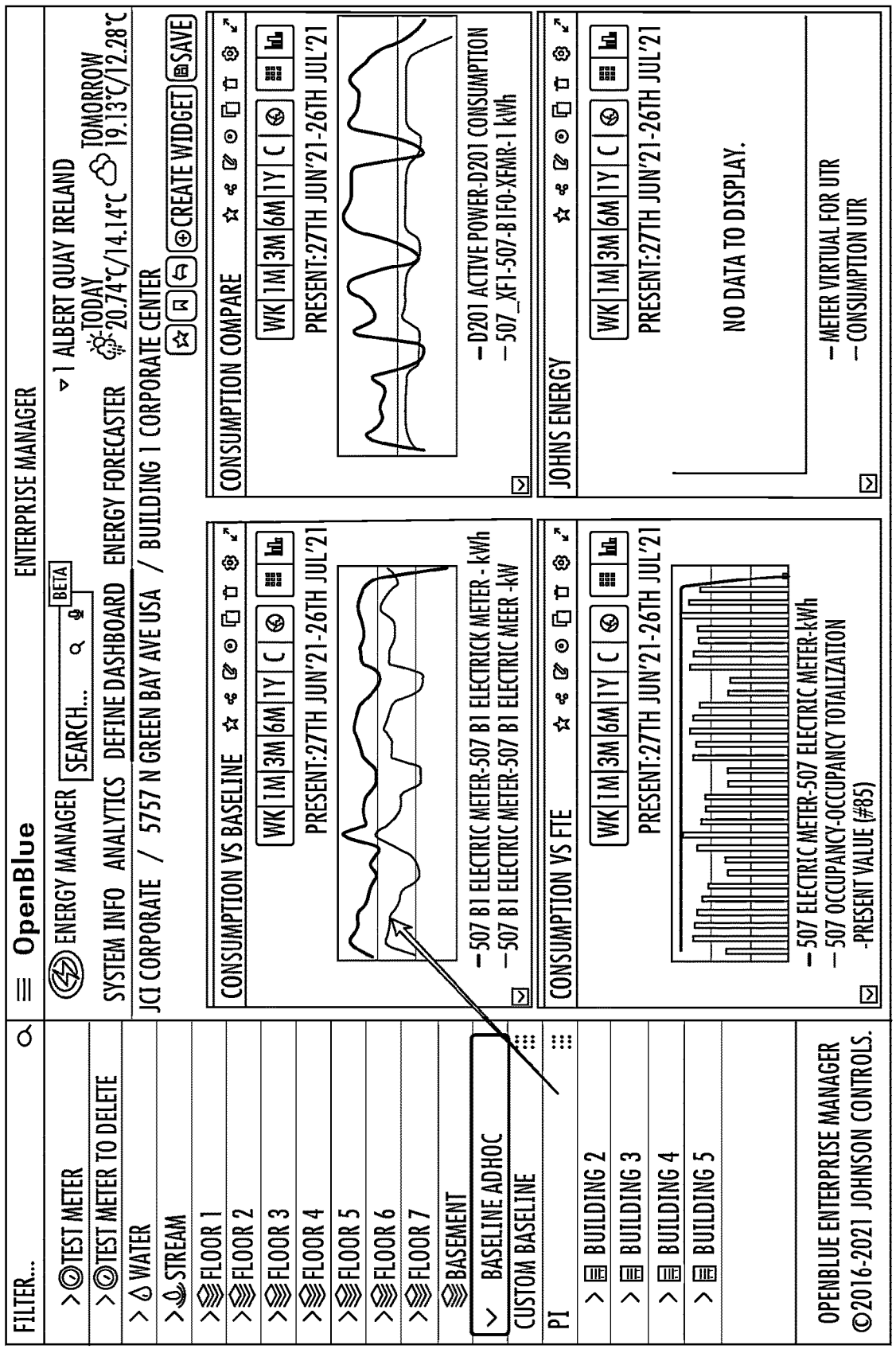

Now referring to FIGS. 11, 12 and 13, snapshots of dashboard allowing user(s) to define criteria for generation of notifications and sustainability indicators is shown. Once a user selects one of the icons 916 a popup window having multiple pages 1100, 1200, and 1300 is displayed on the dashboard. The user is allowed to navigate between pages 1100, 1200, and 1300. First page 1100 allows the user(s) to provide inputs or preferences pertaining to static baseline 904. A list of resources 1106 affiliated with a particular location, that can be Building 1, is provided to the user. The user is allowed to set first threshold 1108 and second threshold 1110 against each of the available resources 1106. In an embodiment, the first threshold and second threshold are in percentage. The first page 1100 also allows user(s) to select one or more resources 1106 as per requirement. In an embodiment, the selection of one or more resources 1106 can be via check boxes 1104 associated with each resource.

The second page 1200 allows user(s) to provide inputs or preferences pertaining to dynamic baseline 906. The list of resources 1106 affiliated with a particular location, that can be Building 1, is displayed. The user is allowed to set first threshold 1108 and second threshold 1110 against each of the available resources 1106. The second page 1200 also allows user(s) to select one or more resources 1106 as per requirement. In an embodiment, the selection of one or more resources 1106 can be via check boxes 1104 associated with each resource.

In some embodiments, the pages 1100 and 1200 allows user(s) to set first threshold 1108 and second threshold 1110 for only selected resource(s).

Still referring to FIGS. 11 and 12, the user can select resource(s) 1106 using check box 1104 for which resource(s) in static baseline or dynamic baseline they want to compare the actual resource consumption. In case the user wishes to not compare consumption against dynamic baseline 906, then user can uncheck all resources 1106 via check boxes 1104. This will enable the system 600 to understand that resource consumption value is not to be compared against dynamic baseline 906. Similarly, if the user does not wish to compare resource consumption against the static baseline 904 then he/she can uncheck all the resources 1106 provided on the page 1100.

Now referring to FIG. 13, third page 1300 that allows user(s) to select notification modes and manage notification recipients list is shown. The third page 1300 is shown to provide a text area 1304 where the user(s) are required to provide email ID's of recipient(s) that are authorized to receive notifications upon generation of first flag and/or second flag. List refers to already added recipients 1306 and icon 1302 is provided against each recipient to selectively delete one or more recipients.

In other words, user enters an email ID of the recipient in the text area 1304. In some cases, the email address matching the key words entered by the user is made available for selection via a dropdown menu. The user then selects the contact by clicking on the contact details in the dropdown menu. All the added recipients 1306 are available along with their profile images. The icon 1302 is a delete icon provided next to each recipient to selectively remove them if required. Once the user confirms the final list of recipients 1306, he/she can press the "Save" button. Further, any unsaved details on page 1300 can be removed by clicking "Clear" button. The clear button clears all unsaved user list with one click.

Now referring to FIGS. 14 to 17, various snapshots 1400, 1500, 1600, and 1700 of a custom dashboard is shown. If user wants to compare resource consumption value for any building subsystem or location, i.e., building, floor(s), or premise, against a static baseline, then the user is allowed to create a custom baseline, i.e., static baseline. Snapshot 1400 depicts user interface for creating static baseline. As shown, the user is allowed to provide a name to the static baseline, selected the type of baseline it is, provide location details for which static baseline is being added or created, and for which resource the baseline is related to. In some embodiments, the user may be required to provide additional information pertaining to the added baseline.

Referring to snapshots 1500 and 1600, the user is allowed to add one or more tracking devices for analysis to restrict resource consumption value for those tracking devices. Similarly, the user can also add more than one resource consumption points for a single location or separate locations by simple dragging and dropping points. Additionally, the user can then select baseline time series from the custom field creator section. Once both consumption point(s) and baseline time series are added for creation of custom dashboard, the user is permitted to define notification criteria via criteria customizer.

Figure 17:
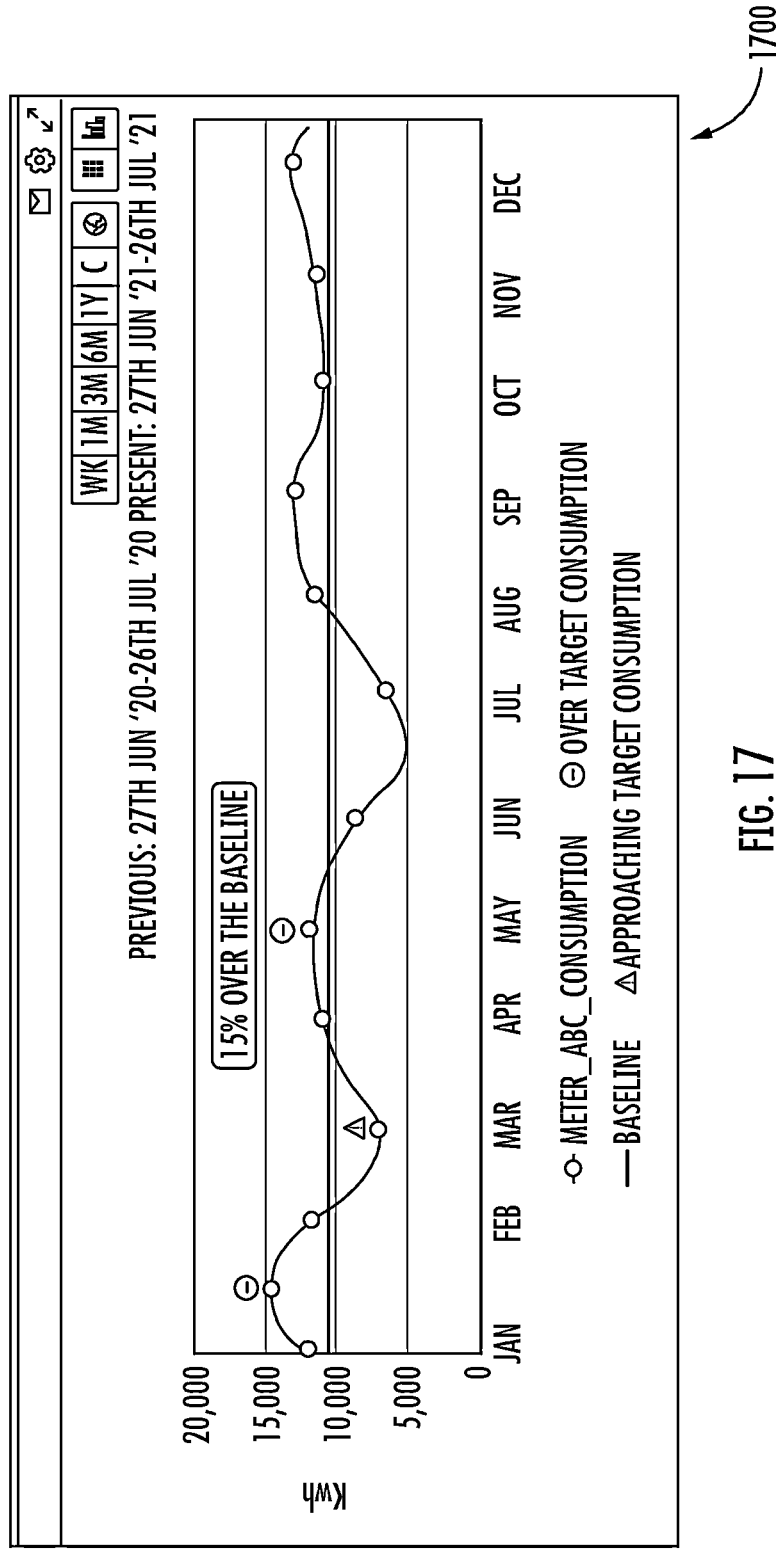

FIG. 17 depicts a snapshot 1700 of a custom widget created by the user. The custom widget is a line chart type graphical representation superimposed with first indicator and second indicator illustrating resource consumption value approaching static baseline and exceeding static baseline by first threshold and second threshold respectively. The custom widget has all functionalities of widget 900 and selection of settings icon may allow user to define first threshold and second threshold.

In an embodiment, referring to FIG. 6, the processing circuit 602 is shown to include a sustainability analyzer 620. The sustainability analyzer 620 is configured to cooperate with resource consumption calculator 608, database 603, and data representor 614. The sustainability analyzer 620 is configured to receive resource consumption value for at least one of, or combination of, resource(s), location(s), and building subsystem(s) from the resource consumption calculator 608 and/or database 603. Subsequently, the sustainability analyzer 620 is configured to perform one or more arithmetic and logical operations on resource consumption values to determine sustainability metric(s) (e.g., determine amount of carbon emission based on resource consumption). The sustainability metrics may include any of a variety of metrics that quantify the performance of a building, campus, or organization with respect to energy sustainability or environmental sustainability. Some examples of sustainability metrics include carbon dioxide ($CO_2$) related metrics (i.e., carbon equivalents) such as carbon emissions, carbon footprint, carbon credits, carbon offsets, and the like. Other examples of sustainability metrics include greenhouse gas emissions (e.g., methane, nitrous oxide, fluorinated gases, etc.), water usage, water pollution, waste generation, ecological footprint, resource consumption, or any other metric that can be used to quantify sustainable building operations. In some embodiments, sustainability metrics can be expressed on a per unit basis such as carbon per number of widgets produced, carbon per volume of product produced, carbon per meals served, carbon per patients treated, carbon per experiments run, carbon per sales revenue, carbon per items shipped, carbon per emails sent, carbon per unit of data processed, carbon per occupant, carbon per occupied room, carbon per normalized utilization value, etc. In some embodiments, sustainability metrics can be generated on an enterprise-wide basis (e.g., one value for the whole enterprise), on a building-by-building basis, on a campus-by-campus basis, by business unit/department, by building system or subsystem (e.g., HVAC, lighting, security, etc.), by control loop (e.g., chiller control loop, AHU control loop, waterside control loop, airside control loop, etc.), by building space (e.g., per room or floor,) or by any other division or aggregation.

In an embodiment, the sustainability analyzer 620 is configured to generate alert signal(s) when one of the sustainability metrics approaches user-defined permissible limit or exceeds user-defined permissible limit by a predetermined value. In one non-limiting embodiment, the value of static baseline can be in accordance with building's sustainability control objective.

In one aspect, the present disclosure envisages a method to perform resource consumption analysis. The method includes the following steps that are performed by the processing circuit 602. At initial step, the method determines a resource consumption value for at least one of or combination of one or more resources, one or more locations, and one or more building subsystems 528. In an embodiment, the processing circuit 602 includes the resource consumption calculator 608 that determines resource consumption value. The resource consumption calculator 608 cooperates with one or more tracking devices 624 to receive resource consumption data based on which the resource consumption value is determined.

Further, the processing circuit 602 compares the resource consumption value with one or more baselines. The baseline includes a static baseline and a dynamic baseline. In some embodiments, the resource consumption value is compared with only static baseline. In some other embodiments, the resource consumption value is compared with only dynamic baseline. In some yet another embodiment, the resource consumption value is compared with both static baseline and dynamic baseline.

The static baseline is a user-defined baseline, wherein the user is permitted to define static baseline via user interface 626. The dynamic baseline is determined by the baseline calculator 610 based on historical resource consumption values.

The interfaces described above may also include selectable options to alter operation of building equipment so as to increase or decrease resource consumption. For example, a user may be able to select an option to implement a resource savings control strategy (e.g., relaxing temperature constraints, turning off certain equipment, changing temperature setpoints, changing other settings), etc. Building equipment may operate differently in response to selection of such an option, for example due to different control settings selected by the processing circuit 602 or other circuitry of BMS 600 in response to user input. The teachings herein thereby result in physical changes in equipment operation driven by the features of the various interfaces, processes, systems, etc. disclosed herein.

Figure 18:
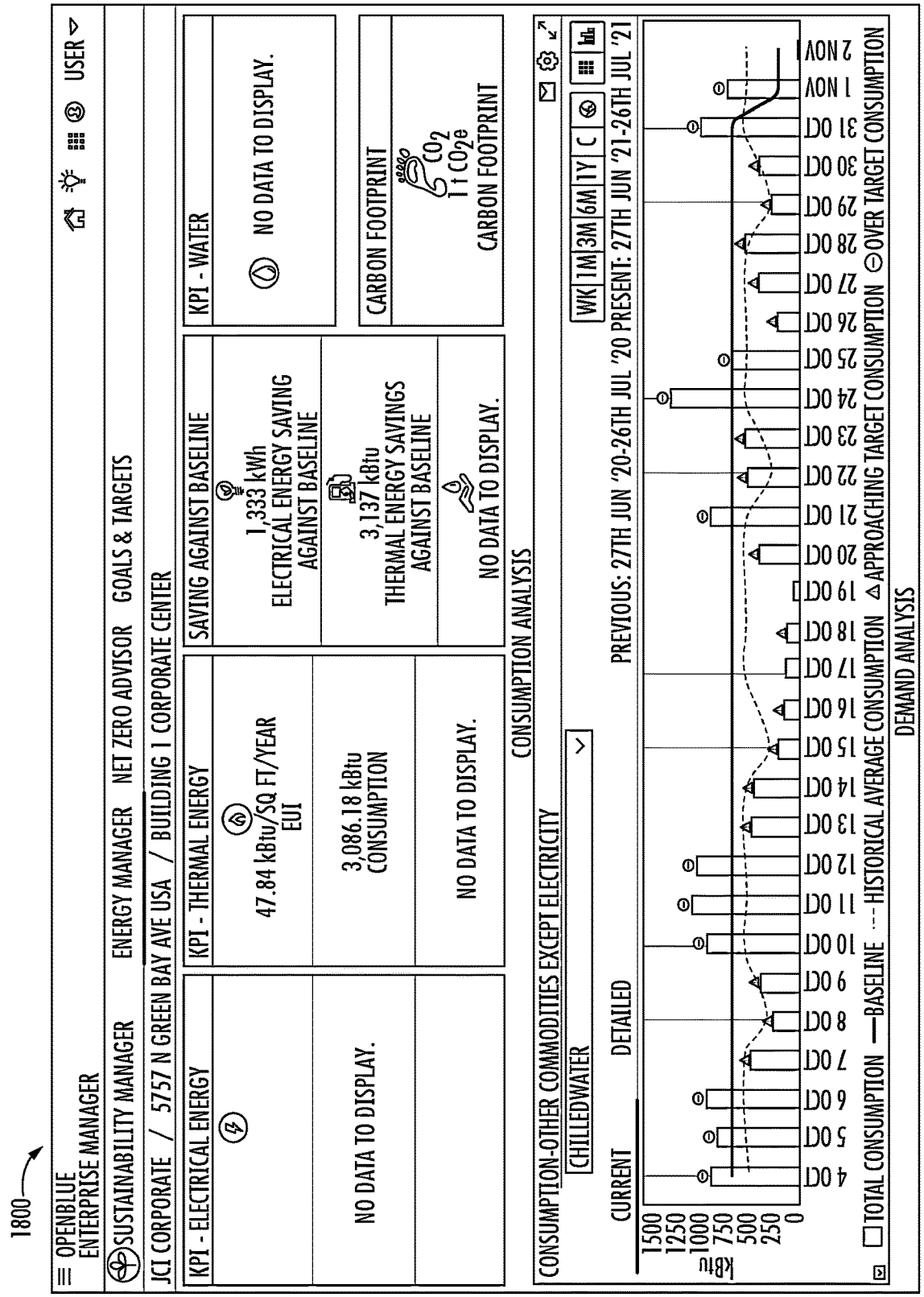
FIGS. 18 and 19 are views of a display screen or portion thereof with a graphical user interface, according to some embodiments.
Figure 19:
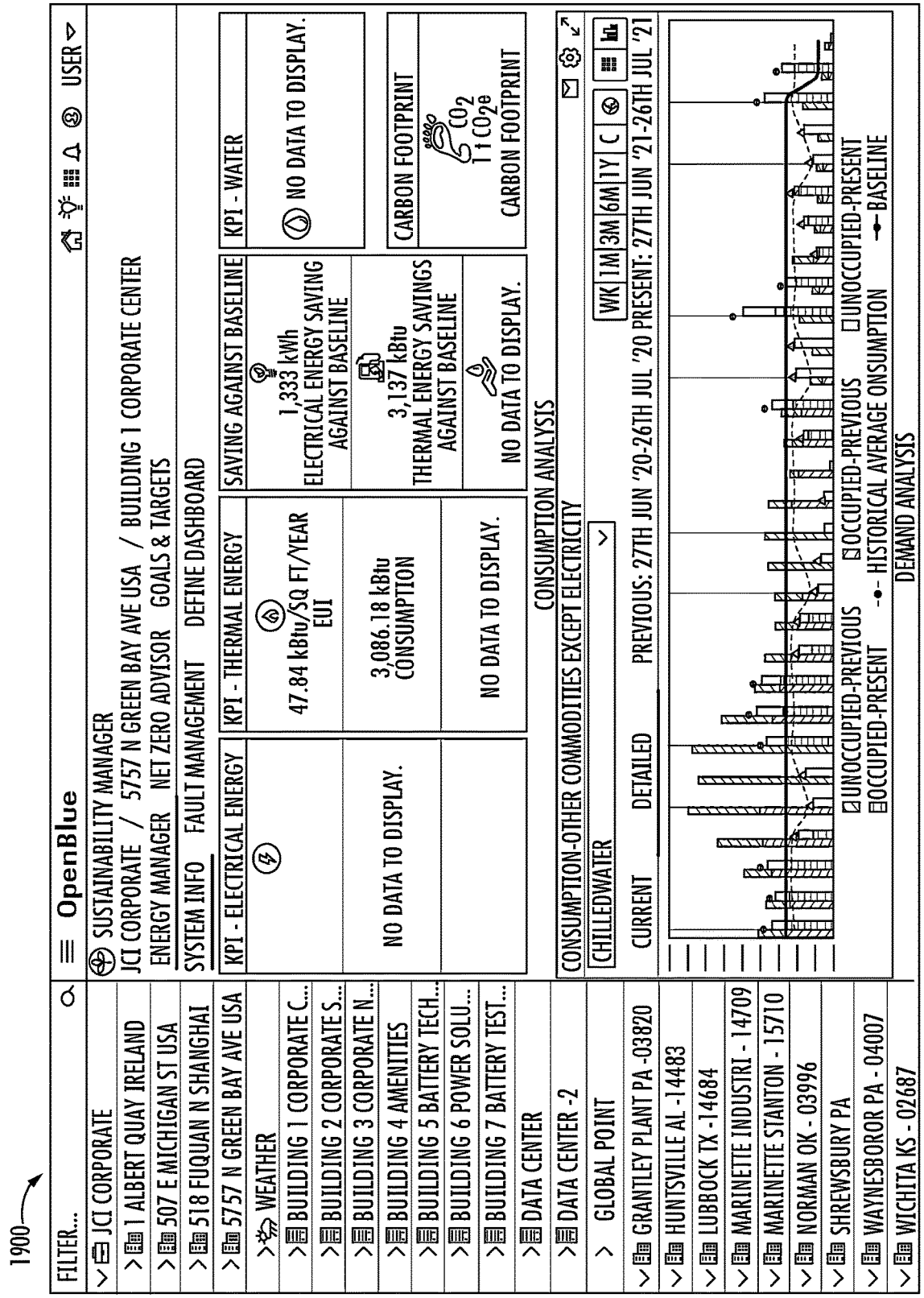

Referring now to FIGS. 18-19, front views 1800 and 1900 of a display screen or portion thereof having a graphical user interface are shown, according to some embodiments. For example, the display screen can be a computer monitor, tablet display, television display, etc. The front views 1800 and 1900 show graphical user interfaces consistent with embodiments described above, and include various ornamental design features. The designs shown are within the scope of the present disclosure, as are all portions thereof in isolation and/or in combination with any other portions thereof. Further, various dimensions of sub-elements should be understood as variable within the scope of the present disclosure, for example heights of bars, locations of icons, positions of plotted lines, numerical values displayed, content of text displayed, etc., such that changes to the views resulting from changes in such data and information are all within the scope of the present disclosure. Various elements may be removed, shown with break lines indicating variability in dimension, rearranged, etc. without departing from the present disclosure.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied, and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions, and arrangement of the exemplary embodiments without departing from the scope of the present disclosure.

The present disclosure contemplates methods, systems, and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A method executable by a building management system, the method comprising:
    generating a graphical user interface comprising:
        a bar graph comprising a plurality of bars representing resource consumption values for a plurality of time periods; and
        a line overlaid on the bar graph and representing a baseline or target resource consumption;
    sorting the resource consumption values into subsets comprising a first subset of the resource consumption values being above the baseline or target resource consumption, a second subset of the resource consumption values being less than the baseline or target resource consumption by less than a threshold amount, and a third subset of the resource consumption values being less than the baseline or target resource consumption by more than the threshold amount;
    adding instances of a first icon aligned with first bars of the plurality of bars based on the first bars representing the first subset of the resource consumption values; and
    adding instances of a second icon aligned with second bars of the plurality of bars based on the second bars representing the second subset of the resource consumption values, the second icon different than the first icon; and
    abstaining from adding icons aligned with third bars of the plurality of bars based on the third bars representing the third subset of resource consumption values.

2. The method of claim 1, wherein the graphical user interface further comprises an additional line overlaid on the bar graph, the additional line representing an additional baseline or target resource consumption.

3. The method of claim 1, further comprising obtaining one or more values defining the baseline or target resource consumption from a user.

4. The method of claim 1, further comprising determining the baseline or target resource consumption based on historical resource consumption values.

5. The method of claim 1, further comprising determining the threshold as a percentage of the baseline or target resource consumption.

6. The method of claim 5, further comprising providing a selectable option for a user to adjust the percentage.

7. The method of claim 5, further comprising generating the resource consumption values by aggregating data from a plurality of meters.

8. One or more non-transitory computer-readable media storing program instructions that, when executed by one or more processors, cause the one or more processors to perform operations comprising:
    generating a graphical user interface comprising:
        a bar graph comprising a plurality of bars representing resource consumption values for a plurality of time periods; and a line overlaid on the bar graph and representing a baseline or target resource consumption;

sorting the resource consumption values into subsets comprising a first subset of the resource consumption values being above the baseline or target resource consumption, a second subset of the resource consumption values being less than the baseline or target resource consumption by less than a threshold amount, and a third subset of the resource consumption values being less than the baseline or target resource consumption by more than the threshold amount;

adding instances of a first icon aligned with first bars of the plurality of bars based on the first bars representing the first subset of resource consumption values;

adding instances of a second icon aligned with second bars of the plurality of bars based on the second bars representing the second subset of resource consumption values, the second icon different than the first icon; and abstaining from automatically adding icons aligned with third bars of the plurality of bars based on the third bars representing the third subset of first resource consumption values.

9. The one or more non-transitory computer-readable media of claim 8, wherein the graphical user interface further comprises an additional line overlaid on the bar graph representing an additional baseline or target resource consumption.

10. The one or more non-transitory computer-readable media of claim 8, wherein the operations further comprise obtaining one or more values defining the baseline or target resource consumption from a user.

11. The one or more non-transitory computer-readable media of claim 8, wherein the operations further comprise determining the baseline or target resource consumption based on historical resource consumption values.

12. The one or more non-transitory computer-readable media of claim 8, wherein the operations further comprise determining the threshold as a percentage of the baseline or target resource consumption.

13. The one or more non-transitory computer-readable media of claim 12, wherein the operations further comprise providing a selectable option for a user to adjust the percentage.

14. The one or more non-transitory computer-readable media of claim 8, wherein the operations further comprise generating the resource consumption values by aggregating data from a plurality of meters.

15. A system comprising:
building equipment operable to consume a resource;
a processing circuit programmed to:
generate a graphical user interface comprising:
a bar graph comprising a plurality of bars representing amounts of consumption of the resource by the building equipment for a plurality of time periods; and a line overlaid on the bar graph and representing a baseline or target resource consumption;

sort the amounts of consumption into subsets comprising a first subset of the amounts of consumption being above the baseline or target resource consumption, a second subset of the amounts of consumption being less than the baseline or target resource consumption by less than a threshold amount, and a third subset of the amounts of consumption being less than the baseline or target resource consumption by more than the threshold amount;

add instances of a first icon aligned with first bars of the plurality of bars based on the first bars representing the first subset of the amounts of consumption; and add instances of a second icon aligned with second bars of the plurality of bars based on the second bars representing the second subset of the amounts of consumption, the second icon different than the first icon; and abstain from adding icons aligned with third bars of the plurality of bars based on the third bars representing the third subset of the amounts of consumption.

16. The system of claim 15, wherein the processing circuit is further programmed to determine the threshold as a percentage of the baseline or target resource consumption.

17. The system of claim 16, wherein the processing circuit is further programmed to provide, via the graphical user interface, a selectable option for a user to adjust the percentage.

18. The system of claim 15, wherein the first icon is circular and the second icon is triangular.

* * * * *